United States Patent [19]
Yamato et al.

[11] Patent Number: 4,777,575
[45] Date of Patent: Oct. 11, 1988

[54] SWITCHING POWER SUPPLY

[75] Inventors: Ikuo Yamato; Norikazu Tokunaga; Hisao Amano, all of Hitachi; Shoichi Noguchi, Chiba; Teruaki Odaka, Mobara, all of Japan

[73] Assignees: Hitachi Ltd.; Hitachi Nisshin Electronics, Co.; Hitachi Device Eng. Co., Ltd., all of Tokyo, Japan

[21] Appl. No.: 31,533

[22] Filed: Mar. 23, 1987

[30] Foreign Application Priority Data

| | | | |
|---|---|---|---|
| Mar. 25, 1986 | [JP] | Japan | 61-64974 |
| May 23, 1986 | [JP] | Japan | 61-117515 |
| Jun. 9, 1986 | [JP] | Japan | 61-131849 |
| Jun. 9, 1986 | [JP] | Japan | 61-131850 |

[51] Int. Cl.[4] ..... H02M 3/335
[52] U.S. Cl. ..... 363/21; 363/97; 219/10.55 B
[58] Field of Search ..... 363/20, 21, 95, 97, 363/131; 219/10.55 B

[56] References Cited

U.S. PATENT DOCUMENTS

| | | | |
|---|---|---|---|
| 4,253,136 | 2/1981 | Nanko | 363/21 |
| 4,253,137 | 2/1981 | Rao | 363/21 |
| 4,593,167 | 6/1986 | Nilssen | 219/10.55 B |
| 4,638,149 | 1/1987 | Wessel et al. | 323/251 X |

FOREIGN PATENT DOCUMENTS

| | | |
|---|---|---|
| 52-4121 | 2/1977 | Japan . |
| 55-33593 | 8/1980 | Japan . |

OTHER PUBLICATIONS

Densi Fijutsu, vol. 20, No. 3 (1978) pp. 34-45.

*Primary Examiner*—Peter S. Wong
*Attorney, Agent, or Firm*—Antonelli, Terry & Wands

[57] ABSTRACT

A switching power supply, in which a series circuit consisting of a primary winding of a transformer and a controllable switch is connected with a DC power source and a secondary winding of the transformer is connected with a first voltage source outputting the voltage developed across the secondary winding during the on-period of the controllable switch and a second voltage source storing the exciting energy of the transformer during the off-period of the controllable switch by using the exciting inductance of the transformer as a current source, a series circuit consisting of the first and the second voltage sources being connected with a load. Owing to this construction, even if voltage-current characteristic of a load having constant voltage characteristic, such as a magnetron, vary due to variations in the temperature, etc., the output voltage is automatically compensated and a stable electric power can be supplied to the load.

29 Claims, 22 Drawing Sheets

FIG. 35A
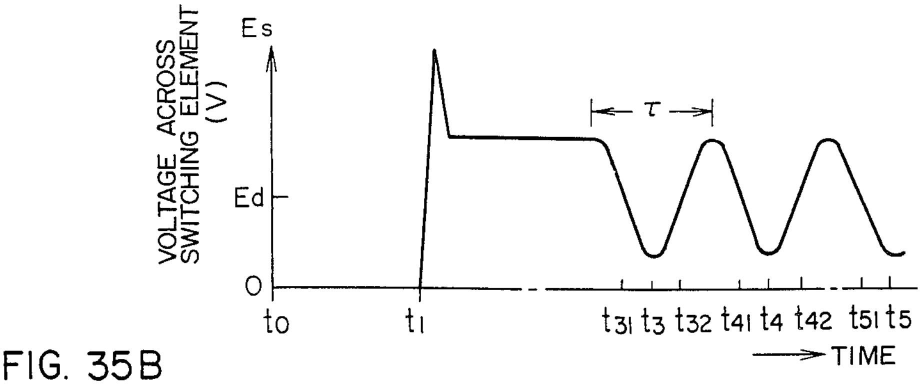
FIG. 35B
FIG. 35C
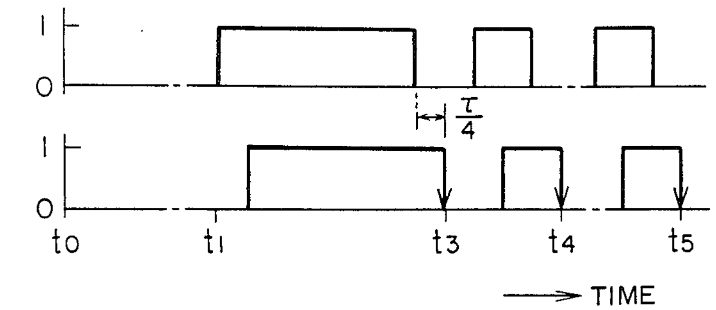
FIG. 36
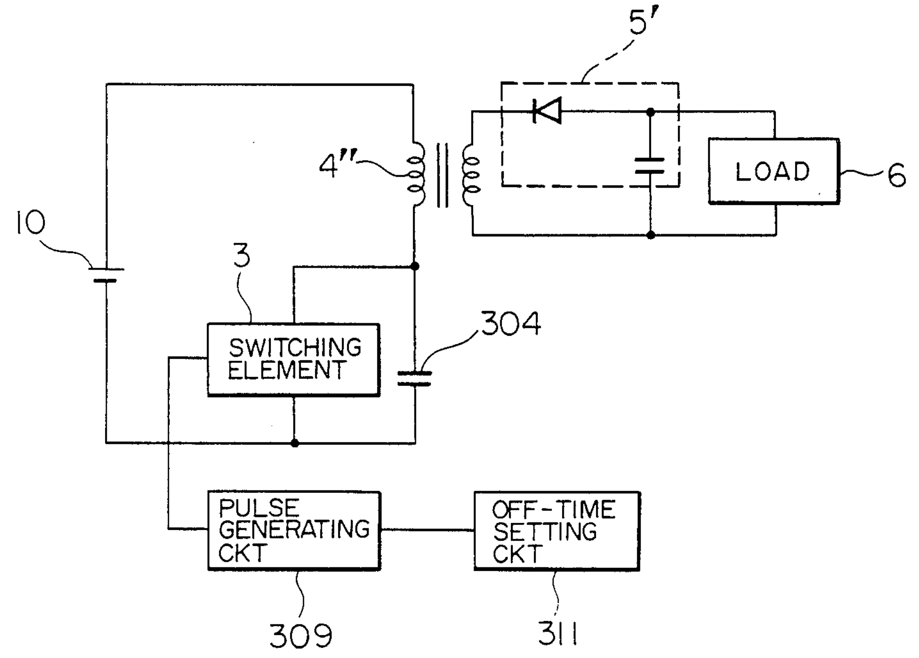

SWITCHING POWER SUPPLY

BACKGROUND OF THE INVENTION

This invention relates to a switching power supply, and in particular to a switching power supply suitable for driving a magnetron used in a microwave oven, etc.

A high voltage (e.g. a high voltage of an order of magnitude of kV) and a high electric power are necessary for driving a magnetron, whose current-voltage characteristics have constant voltage characteristics and vary depending on the temperature of the magnetron. FIG. 1 shows the relation between the anode current of the magnetron and the anode-cathode voltage with a parameter of the temperature of the magnetron by way of example. Further, when the intensity of the current increases over a critical value, it gives rise to an abnormal oscillation.

Thus, it is fairly difficult to drive stably a magnetron. For this reason, heretofore mostly used are power supplies of the type in which the AC voltage of the commercial frequency is stepped up by means of a transformer.

One of such prior art power supplies for driving a magnetron used in microwave ovens, etc. has been so constructed that commercial electric power is rectified by means of a half-wave voltage doubler circuit after having been stepped-up by using a transformer and supplied to the magnetron and the control of its output power has been effected by controlling the conduction phase of a bidirectionally controllable switching element connected in series with the primary winding of the transformer, as described e.g. in Denshi Gijutsu, Vol. 20, No. 3 (1978), p. 34–p. 45. On the other hand, recently small and lightweight switching power supplies have become available. However, in the case where they are used in a power supply for driving a magnetron in a microwave oven, etc., following problems are encountered. That is, when a magnetron is driven without load or with a light load, a part of emitted microwave is returned to the magnetron by reflection and heats itself, which raises the temperature of the magnetron and at the worst case gives rise to a risk to destroy the microwave output portion made of glass or ceramic. In the prior art power supply, in which the commercial frequency voltage is stepped-up by means of a transformer, since its output is automatically reduced for a light load, overheat of the magnetron due to the reflection is relatively small. On the contrary, in the case where the switching power supply is used, since an output previously set is emitted also for a light load, the overheat of the magnetron due to the reflection gives rise to a more serious problem.

In addition, the current-voltage characteristics of a magnetron vary, depending on the temperature, as indicated in FIG. 1. In this way, in the case where the temperature is increased, its operating voltage decreases and the current intensity increases for the same applied voltage. At the same time abnormal oscillation (moding) is caused when the current intensity exceeds a certain value, e.g. about 1 A in the case of a power supply for a microwave oven, etc. Consequently, it is necessary to regulate the input of the magnetron in dependence on the temperature.

In the prior art power supply disclosed in the above-mentioned literature, although the magnetron has constant voltage characteristics and also has an upper limit in the tolerable instantaneous electric power of its input, since the voltage applied to the magnetron has a large pulsation, the control margin of the output electric power is narrow and therefore there is a problem that it is necessary to turn off the power supply circuit by using a thermostat, etc. in order to stop the drive of the microwave oven etc.

In addition, in the prior art power supply described in the above-mentioned literature, since the transformer in the power supply of the magnetron in the microwave oven is operated on the commercial frequency source, this transformer is large and heavy and further it should be designed separately, depending on whether the used commercial frequency is 50 Hz or 60 Hz. The magnetron, which is the load, has the constant voltage characteristics, and when the voltage applied between the anode and the cathode exceeds the cut-off voltage, anode current begins to flow and increases linearly with increase in the applied voltage to generate a microwave output. However, as described earlier when the anode current reaches the critical value, the abnormal oscillation is caused and almost no microwave output is obtained. This abnormal oscillation greatly shortens the life of the magnetron. In addition, the cut-off voltage of the magnetron is e.g. approximately about 4 kV and this value varies, depending on the temperature of the magnetron. In a normal operating state of the magnetron it varies by several 100 V. However, in the prior art power supply, since no consideration is given to the change in the power supply output voltage and to the change in the cut-off voltage of the magnetron, there are problems that at the rise of the voltage of the power supply or at the lowering of the cut-off voltage the anode current exceeds the critical value and causes abnormal oscillation or that at the lowering of the voltage of the power supply or at the rise of the cut-off voltage the voltage applied to the magnetron becomes less than the cut-off voltage and almost no microwave output is obtained. Further, in order to resolve these problems, it is conceivable to determine the turn ratio of the transformer such that the voltage applied to the magnetron is higher than the expected highest cut-off voltage even if the power supply voltage decreases to its minimum value and to detect the anode current when the voltage of the power supply rises so as to turn off the bidirectionally controllable switch described above before the anode current reaches the critical value, to thereby prevent the abnormal oscillation. However, this scheme would cause problems such as necessities of a means for detecting the anode current and a complicated control circuit for the bidirectionally controllable switch.

As a prior art switching power supply for microwave ovens, there is known one disclosed in JP-A-No. 58-4121. In this switching power supply, the input frequency applied to the high voltage transformer is varied by using a frequency converter so that the oscillation output of the magnetron is varied. However, in this switching power supply it is not taken into account that the current-voltage characteristics of the magnetron vary, depending on the temperature, as described above. Consequently it doesn't permit to drive the magnetron under the optimum condition.

Further, in this switching power supply no consideration is given to the switching loss of a switching element used in the frequency converter.

In the case of resonance type converters, the method to turn-on the switching element at the point where the voltage applied thereto is lowest, in order to reduce the switching loss, is generally utilized. However, in these prior art resonance type converters, the resonance voltage is generated either by disposing a new resonance circuit on the input side of the transformer or by utilizing the circuit behavior on the output side of the transformer. Consequently, the operating margin is narrow and it cannot be used in the case, for example, where the input power source has an unsmoothed voltage waveform. On the other hand, for the switching power supply for a load such as a microwave oven which requires a high electric power, a large input current is necessary. Therefore, in order to satisfactorily smooth the input voltage, a capacitor having a large capacity is needed, which makes the power supply impractical.

It is hitherto not known to generate a resonance voltage utilizing only an exciting inductance and a capacitor for absorbing surge voltages, as proposed in this application.

In addition to the above-mentioned JP-A-No. 58-4121, a prior art switching power supply for the magnetron is disclosed in Japanese Utility Model Application Publication No. 55-33593.

SUMMARY OF THE INVENTION

An object of this invention is to provide a switching power supply suitable for driving a non-linear load such as a magnetron used for a microwave oven.

Another object of this invention is to provide a switching power supply for driving a magnetron for use in a microwave oven or the like which does not cause the overheat of the magnetron, to thereby eliminate the need to stop the operation of the magnetron due to the overheat.

Still another object of this invention is to provide a switching power supply which can be used for the power supply for a microwave oven and in which the transformer is small and lightweight.

Still another object of this invention is to provide a switching power supply capable of obtaining stably a required microwave output by using a simple control circuit even when the input power source voltage and the cut-off voltage of the magnetron vary.

Still another object of this invention is to provide a switching power supply capable of reducing the turn-off loss of the controllable switch and of suppressing the voltage applied to the controllable switch to a low value, which is suitable for supplying a high electric power.

Still another object of this invention is to provide a power supply having a wide operating margin and a high efficiency as a switching power supply requiring a high electric power for a microwave oven, etc.

In order to achieve these objects, according to one aspect of this invention, a power supply for driving a magnetron comprises a first rectifier circuit connected with an AC power source, an electric power converting circuit and a second rectifier circuit in combination so that the pulsation in the voltage applied to the magnetron is small and the control margin of the output electric power is wide, and is further provided with means for detecting the temperature of the magnetron, whereby the input electric power of the magnetron is controlled by the electric power converting circuit, depending on the temperature of the magnetron.

In this power supply for driving the magnetron, in the case where the temperature of the magnetron exceeds a predetermined value, since the electric power converting circuit acts so as to reduce the input electric power of the magnetron, it is possible to reduce the electric power of the microwave returning to the magnetron by the reflection, to thereby prevent the overheat of the magnetron.

According to another aspect of this invention, the controllable switch for the primary winding of the transformer and the primary circuit of the controllable switch connected in series with the DC input power source is switched on and off with a high frequency so that the transformer is driven with a high frequency. In this way, it can be realized to make the transformer smaller and lighter. This idea is founded on the following observation.

For a power supply for driving a magnetron in a microwave oven, as a method according to which a required electric power would be supplied to the magnetron even when the power supply voltage and the cut-off voltage of the magnetron vary, it may be possible to supply electric power to the magnetron by means of a current source. For example, in the case where an on/off chopper type (i.e. flyback type) switching power supply is used, electric energy of a DC power source is stored as exciting energy for the transformer during the on-period of the controllable switch provided in a circuit connected in series with the DC input power source and composed of the primary winding of the transformer and the primary circuit of the controllable switch and the exciting energy is supplied to the magnetron from the transformer acting as the current source during the off-period of the controllable switch. Accordingly, by varying the on/off duty of the controllable switch so as to control the exciting current for the transformer it may be possible to supply the required electric power to the magnetron without producing any abnormal oscillation even when the voltage of the input power source varies. However, if the feedback-control utilizing the output current is to be introduced to control the on/off duty of the controllable switch some means for detecting the output current becomes necessary, to thereby complicate the control circuit, making this method uneconomical. Furthermore, in the prior art on/off chopper type switching power supply, even in the case where the feedback control is not effected, the control circuit of the controllable switch is complicated. That is, since the output power of the on/off chopper type switching power supply is proportional to the square of the product of the voltage of the power source and the on/off duty of the controllable switch, in the case where a constant power is to be outputted regardless of the variations in the power source voltage, the on/off duty and the power source voltage are inversly proportional to each other. Consequently, the control circuit for the controllable switch should have non-linear characteristics and thus the control circuit should have a complicated structure. On the other hand, in an on/on chopper type (i.e. forward type) switching power supply, although the output voltage is proportional to the on/off duty of the controllable switch on the average, since the instantaneous output voltage proportional to the voltage of the input power source is applied to the magnetron, when the voltage of the power supply varies, phenomena are produced that the abnormal oscillation is generated or that the applied voltage doesn't exceed the cut-off voltage, providing no microwave output. It is because, in the power supply for driving the magnetron, the output voltage is high and accordingly, an output capacitor having a satisfactorily large capacity can not be used for the reason of the withstand voltage or other restrictions. Thus, the output voltage proportional to instantaneous power source voltage is applied to the magnetron.

According to still another aspect of this invention, based on the above-mentioned observation, a switching power supply comprises:

a series circuit connected in series with the input DC power source and consisting of the primary winding of a transformer and a controllable switch, a first voltage source, connected with the secondary winding of the transformer for outputting a secondary voltage generated in the secondary winding during the on-period of the controllable switch, the secondary voltage being proportional to the voltage of the input power source, a second voltage source connected with the secondary winding of the transformer, the exciting inductance of the transformer being the current source of the second voltage source, the exciting energy fed from the input power source and stored in the exciting inductance of the transformer during the on-period of the controllable switch being supplied to the second voltage source during the off-period of the controllable switch, the load being connected with the series circuit of the first and the second voltage sources. Owing to this structure, the switching power supply can have both the characteristics of the on/off chopper type and those of the on/on chopper type.

With this structure, when the voltage of the input power supply varies, by varing the on/off duty of the controllable switch, both the energy supplied to the first voltage source and the energy stored in the transformer and supplied to the second voltage source are controlled so that the variations in the instantaneous output voltage of the first voltage source is automatically compensated by the output voltage of the second voltage source, to thereby supply a stable and desired electric power to the load. That is, for example, in the case where the input voltage increases, the output voltage of the first voltage source increases, too. However, at this time, since the controllable switch is so controlled that its on-period is shortened, the energy stored in the transformer during this on-period decreases, and consequently the output voltage of the second voltage source is lowered. As a result, the output voltage, which is the sum of the output of the first voltage source and that of the second voltage source, is so controlled that it is kept constant, even if the input voltage increases. In the case where the input voltage decreases, the reverse process is produced and thus the output voltage is kept constant. When the load varies, e.g. when the cut-off voltage of the magnetron is lowered, assuming that the voltage of the input power source is constant, since the anode current of the magnetron increases, the output current of the power supply increases, too. And accordingly, the current flowing out from the second voltage source increases. However, since the energy supplied from the exciting inductance of the transformer to the second voltage source is kept constant, the output voltage of the second voltage source decreases. As a result, the output voltage of the power supply, which is the sum of the output voltage of the first voltage source and that of the second voltage source, decreases automatically and thus the increase of the output current, i.e. the anode current is suppressed. In the case where the cut-off voltage increases, the reverse process proceeds and the decrease of the anode current is suppressed.

The above-mentioned object to obtain a power source operable in a wide range and with a high efficiency is achieved by adopting not a so-called resounance type converter but by adopting a flyback type power source, which is known heretofore, or a forward type power source with the following circuit means added thereto.

In the case where a high power load such as a microwave oven is driven by the flyback or the forward converter stated above, since surge voltages appearing in the switching element are very large, it is inevitably required that a capacitor for absorbing the surge voltages be of a large capacity. Therefore, the resonance time constant determined by the capacity of the capacitor and the exciting inductance of the transformer become great, generating a large oscillation voltage after the transformer has been reset. Prior art flyback and forward converters are used for small electric power and use a small capacity capacitor for absorbing surge voltages and for this reason no large oscillation voltage stated above is produced. On the basis of the observation of this large oscillation voltage, the inventors of this application here propose an arrangement in which the switching element is turned on at a valley portion of this oscillation voltage. This can be achieved by adding a circuit for detecting the time of the valley portion of the oscillation voltage and a pulse generating circuit controlling the on/off of the switching element. That is, the detection of the valley portion of the oscillation voltage can be effected on the basis of the variation amount of the current or the voltage within the switching power supply circuit. When the oscillation voltage is in a valley portion, a signal is produced, which is sent to a pulse generating circuit in the following stage. The pulse generating circuit receives this signal and sends an instruction to turn on the switching element to the switching element. By this process the switching element is turned-on at a valley portion of the oscillation voltage.

This scheme can be applied not only to the prior art flyback or forward type power supply but also to the novel power supply according to this invention, and further, as stated later, when it is combined with this novel power supply, the switching loss is minimized.

BRIEF DESCRIPTION OF THE DRAWINGS

FIGS. 35A, 35B and 35C indicate waveforms in the circuit indicated in FIG. 24, wherein FIG. 35A indicates the voltage waveform of the switching element; FIG. 35B indicates the waveform in a voltage comparator; FIG. 35C indicates the waveform in a delay circuit.

FIG. 36 is a block diagram illustrating still another embodiment of the circuit according to this invention.

FIG. 37B indicates the waveform in an off time setting circuit.

DESCRIPTION OF THE PREFERRED EMBODIMENTS

Figure 1:
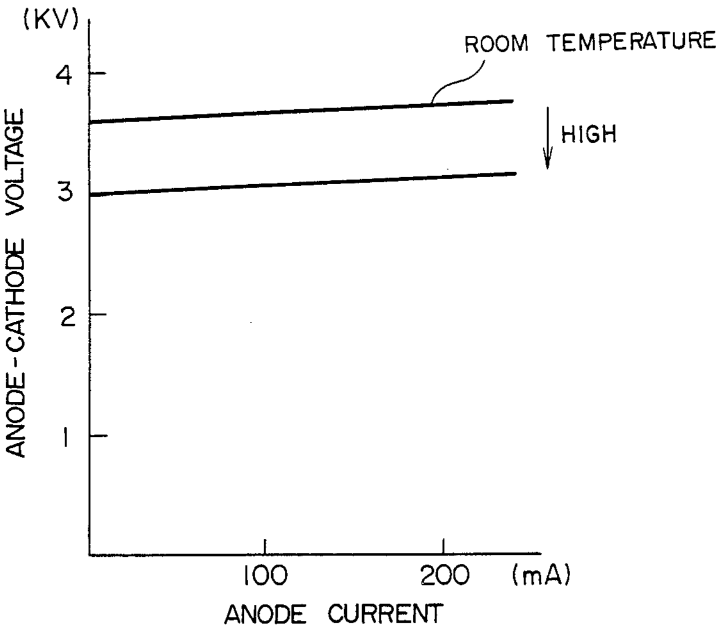
FIG. 1 is a diagram showing an example of a characteristic of a magnetron.

Hereinbelow embodiments of this invention will be explained, referring to the drawings.

Figure 2:
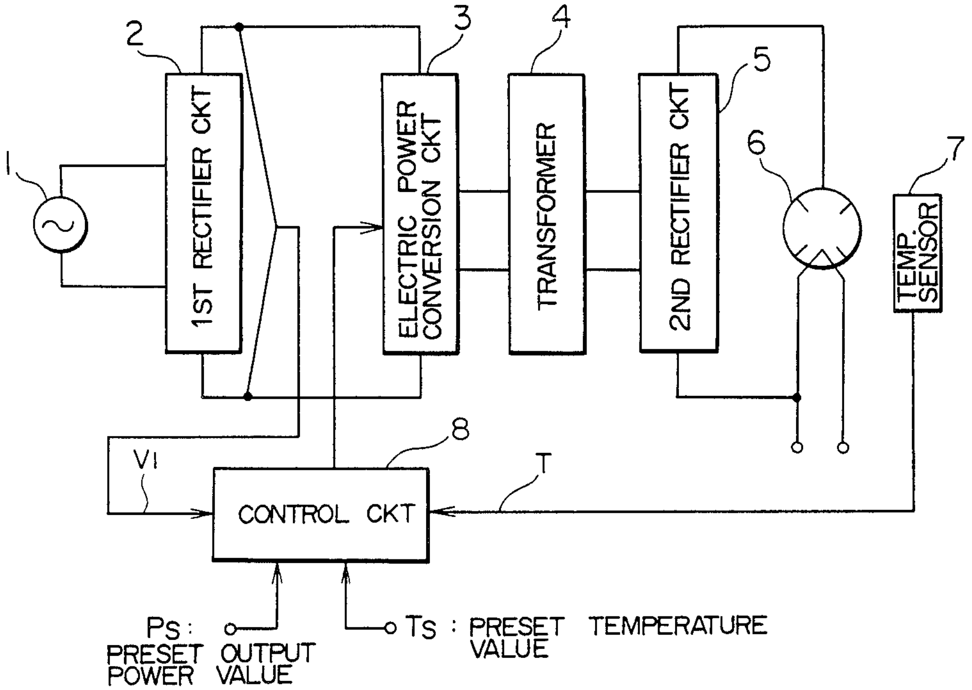
FIG. 2 is a block diagram illustrating the basic construction of an embodiment of the power supply for driving a magnetron according to this invention.

FIG. 2 is a block diagram illustrating the basic construction of an embodiment of the power supply for driving a magnetron according to this invention. In the figure, reference numeral 1 denotes an AC power supply; 2 a first rectifier circuit; 3 an electric power converting circuit; 4 a transformer; 5 a second rectifier circuit; 6 a magnetron; 7 a device for detecting the temperature of the magnetron; and 8 a control circuit for controlling the electric power converting circuit. Throughout drawings, like reference numerals are attached to like parts.

In this construction, the AC voltage of the AC power source is converted to a DC voltage by the first rectifier circuit 2. A controllable output power is obtained by the electric power converting circuit to which the DC voltage thus obtained by this first rectifier circuit 2 is applied as an input thereto. The output voltage of this electric power converting circuit 3 is stepped up by the transformer 4 connected with the electric power converting circuit 3. This stepped up voltage is rectified by the second rectifier circuit 5 connected with the high voltage side of the transformer 4 and the output of this second rectifier circuit 5 is supplied to the magnetron 6. The electric power converting circuit 3 is constituted e.g. by a DC-to-AC converter of the switching type.

In operation, the temperature T of the magnetron 6 is detected by the temperature detecting device or sensor 7. When the temperature T of the magnetron 6 is lower than a preset temperature value $T_S$, an output power instruction value P of the electric power converting circuit 3 is kept to be equal to a preset output power value $P_S$ by the control circuit 8 which controls the electric power converting circuit 3 and the duty, which is the ratio of the on-period to the sum of the on-period and off-period of the switching element (not shown) provided in the electric power converting circuit 3, is controlled on the basis of the DC voltage of the output of the first rectifier circuit 2 so that the output power of the electric power converting circuit 3 is kept to be equal to the output power instruction value P. On the contrary, when the temperature T of the magnetron 6 exceeds the preset temperature value $T_S$, the output power instruction value P is reduced so that it is lower than the preset output power value $P_S$. In this way, by controlling the duty of the switching element in the electric power converting circuit 3 such that the output power of the electric power converting circuit 3 is kept to be equal to the output power instruction value P, the magnetron 6 is operated always below the preset temperature $T_S$ and thus overheating of the magnetron 6 is prevented.

Figure 3:
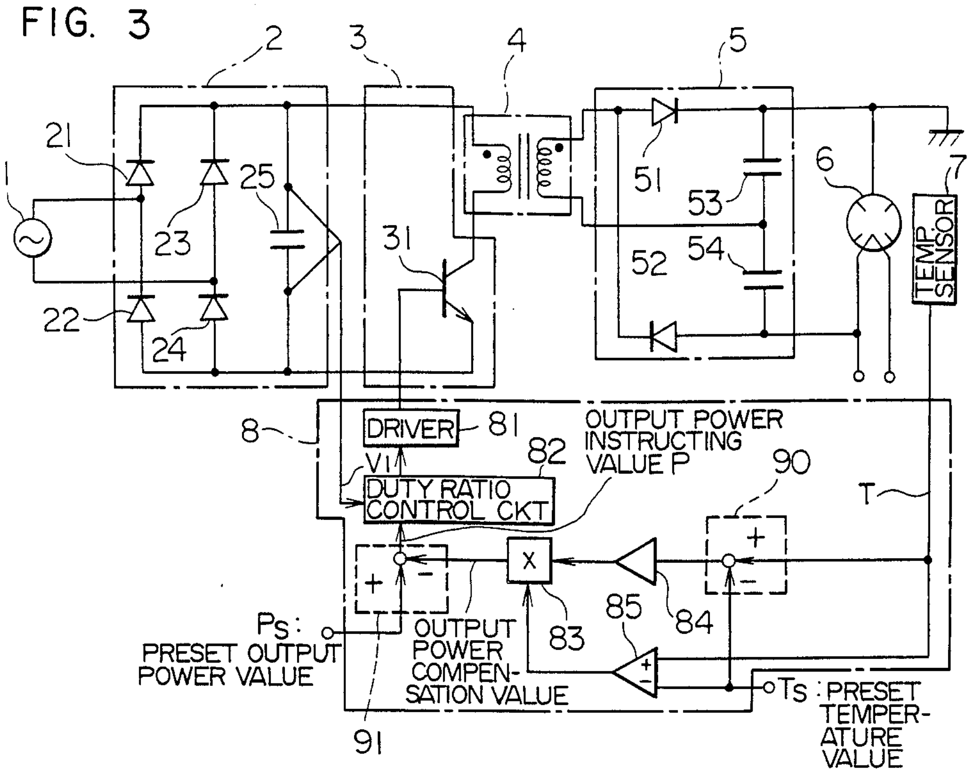
FIG. 3 is a block diagram illustrating the circuit construction of another embodiment according to this invention.

FIG. 3 is a block diagram illustrating the circuit construction of another embodiment according to this invention. In FIG. 3, reference numerals 21–24 represent diodes; 25 a capacitor; 31 only one transistor constituting an on/on chopper circuit; 51 and 52 diodes; 53 and 54 capacitors; 81 a transistor driving circuit; 82 a duty ratio controlling circuit; 83 is multiplier; 84 an amplifier; 85 a comparator; 90 and 91 substracters.

Figure 4:
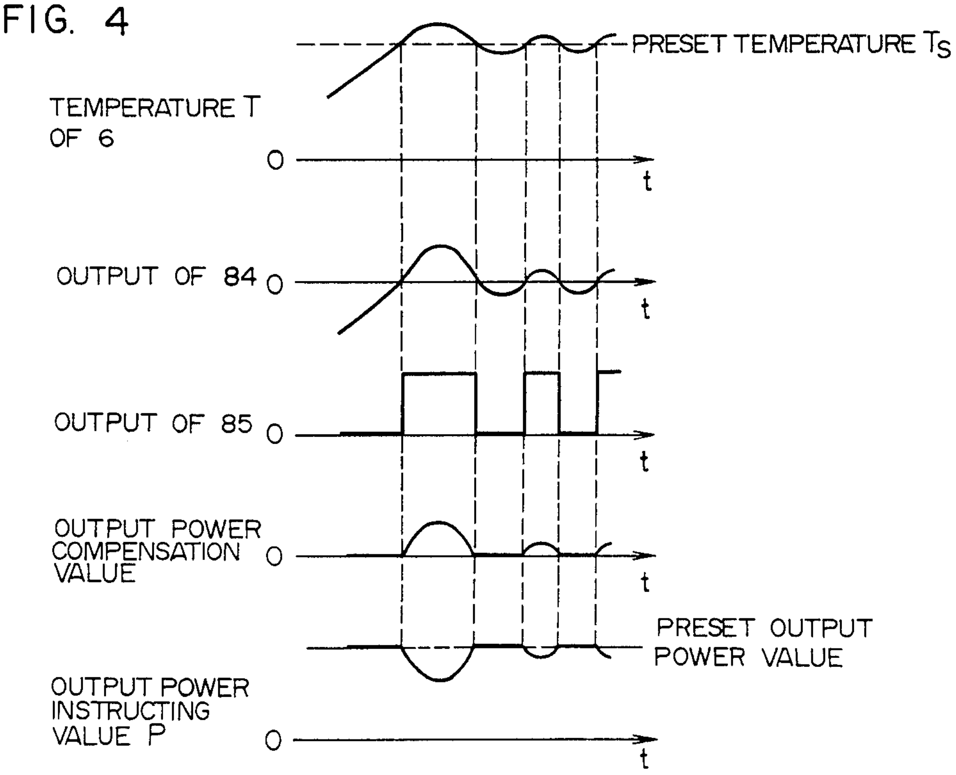
FIG. 4 shows waveforms useful for explaining the operation of the circuit indicated in FIG. 3.
Figure 5:
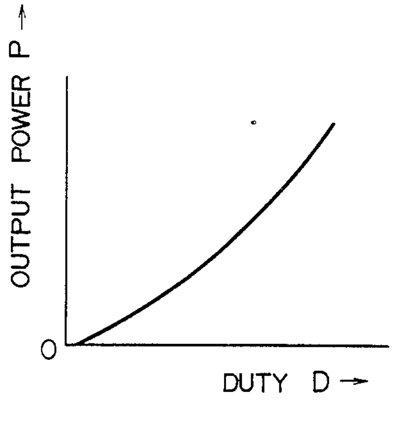
FIG. 5 is a diagram showing an example of an output power VS duty characteristic of the circuit indicated in FIG. 3.

FIG. 4 indicates waveforms in various parts for explaining the operation of the circuit indicated in FIG. 3. FIG. 5 is a graph showing an example of output power-duty characteristic of the circuit indicated in FIG. 3. The operation of the circuit indicated in FIG. 3 will be explained below, referring to FIGS. 4 and 5. At first, the difference between the temperature T of the magnetron 6 detected by the temperature detecting device 7 and the preset temperature value $T_S$ is obtained by the subtracter 90. This difference is amplified by the amplifier 84 provided in the control circuit 8. At the same time, the temperature T of the magnetron 6 is compared with the preset temperature value $T_S$ by the comparator 85. The output, which is the result of this comparison, is multiplied by the output of the amplifier 84 by the multiplier 83. The value thus obtained being used as a compensation value for the output power, a value obtained by substracting this compensation value from the preset output power value $P_S$ by means of the substracter 91 is given to the duty ratio controlling circuit 82 as the output power instruction value P. In this way, when the temperature T of the magnetron 6 is lower than the preset temperature value $T_S$, the preset output power value $P_S$ is used as the output power instruction value P. On the contrary, when the temperature T of the magnetron 6 exceeds the preset temperature value $T_S$, the value obtained by substracting the compensation value which is proportional to the difference between the temperature T of the magnetron 6 and the preset temperature value $T_S$ from the preset output value $P_S$, is used as the output power instruction value P, and it is possible to reduce the temperature T of the magnetron 6 below the temperature $T_S$ of the magnetron 6 by driving the duty ratio controlling circuit 82 to change the duty ratio D of the transistor 31 provided in the electric power converting circuit (chopper circuit) 3 through the transistor driving circuit 81 depending on the instruction value P and the DC voltage $V_I$ of the first rectifier circuit 2 according to the output power-duty ratio characteristic indicated in FIG. 5. As understood from the above description, 83–85, 90 and 91 constitute means for adjusting the preset output power value $P_S$. Further, since the second rectifier circuit 5 in FIG. 3 is constituted by a full-wave voltage doubler circuit, the ripple in the voltage applied to the magnetron is kept to be small. In this connection, the power supply consisting of the electric power converting circuit 3, the transformer 4 and the second rectifier circuit 5 shown in FIG. 3 constitute the power supply invented by the inventors of this invention and will be explained later in more detail.

Figure 6:
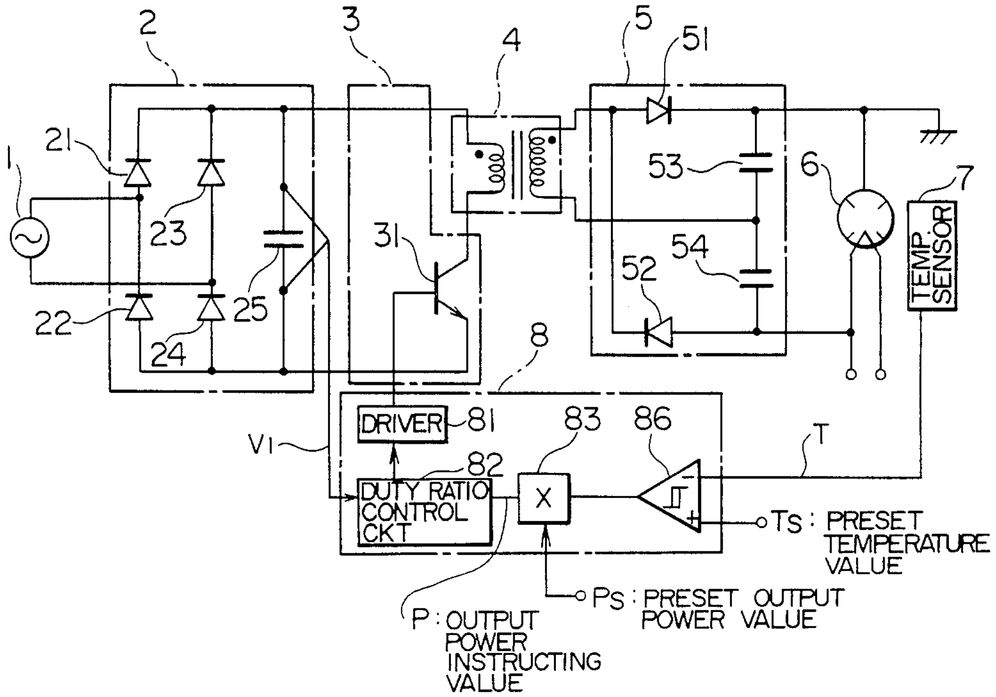
FIG. 6 is a block diagram illustrating the circuit construction of still another embodiment according to this invention.
Figure 7:
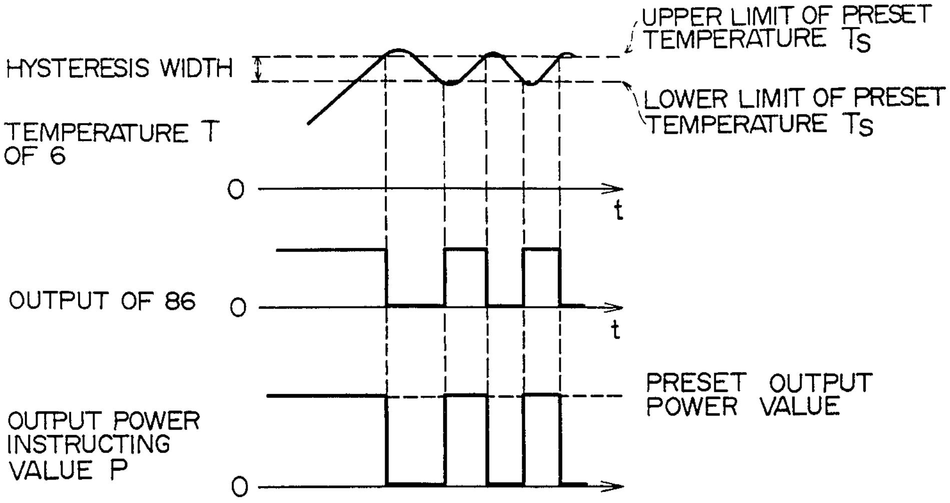
FIG. 7 shows waveforms useful for explaining the operation of the circuit indicated in FIG. 6.

FIG. 6 is a block diagram illustrating the circuit construction of still another embodiment according to this invention. In FIG. 6, reference numeral 86 represents a comparator having a hysteresis. FIG. 7 shows waveforms in various parts for explaining the operation of the circuit indicated in FIG. 6. The operation of the circuit shown in FIG. 6 will be explained below, referring to FIG. 7. By multiplying the result of the comparison by the comparator 86 having a hysteresis provided in the control circuit 8, of the temperature T of the magnetron 6 coming from the temperature detecting device 7 and the preset temperature value $T_S$ by the preset output power value $P_S$ during the period from the moment where the temperature T of the magnetron 6 reaches the upper limit of the preset temperature value $T_S$ to the moment where it decreases to the lower limit of the preset temperature value $T_S$, the output power instruction value P is set to zero and during the other period the output power instruction value P is the preset output power value $P_S$. It is possible to keep the temperature T of the magnetron 6 between the upper and the lower limit of the preset temperature value $T_S$ by operating the duty ratio controlling circuit 82 so that the duty ratio D of the transistor 31 in the electric power converting circuit (chopper circuit) 3 varies through the transistor driving circuit 81 in dependence on the output power instruction value P and the DC voltage $V_I$ of the first rectifier circuit 2 according to the output power-duty ratio characteristic indicated in FIG. 5.

Figure 8:
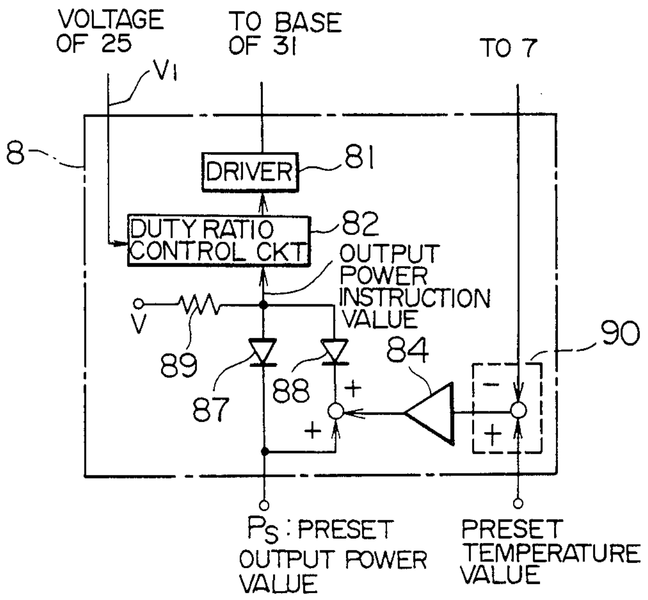
FIG. 8 is a block diagram illustrating partially the circuit construction of still another embodiment according to this invention.
Figure 9:
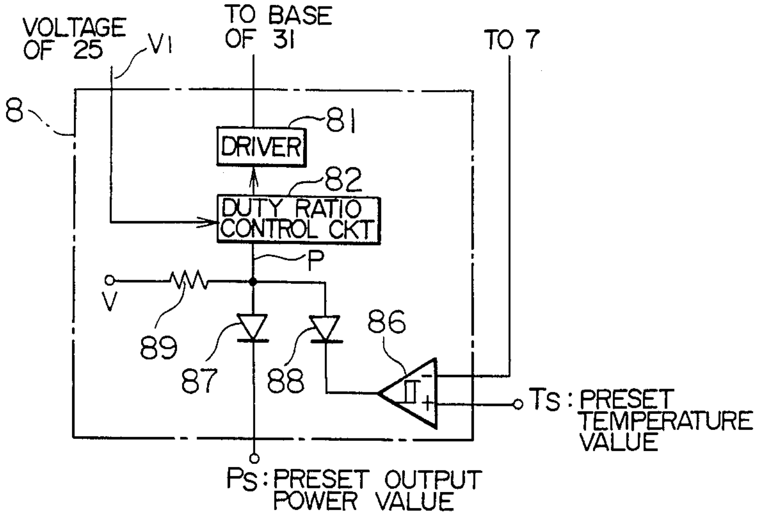
FIG. 9 is a block diagram illustrating partially the circuit construction of still another embodiment according to this invention.

FIG. 8 is a block diagram illustrating partially the circuit construction of still another embodiment according to this invention. In FIG. 8, reference numerals 87 and 88 represent diodes and 89 represents a resistor. The circuit shown in FIG. 8 differs from that shown in FIG. 3 in the circuit construction of the control circuit 8 for the electric power converting circuit 3 and the output power instruction value P is the smaller one of the preset output power value $P_S$ and the value obtained by compensating the preset output power value $P_S$ by using the output power compensation value which is proportional to the difference between the preset temperature value $T_S$ and the measured value of the temperature T from the temperature detecting device 7. The control circuit 8 in this embodiment operates in the same way as that in FIG. 2. FIG. 9 is a block diagram illustrating partially the circuit construction of a still another embodiment according to this invention. The circuit shown in FIG. 9 differs from that shown in FIG. 6 in the circuit construction of the control circuit 8 provided in the electric power converting circuit 3. Here also the control circuit 8 operates in the same way as that in FIG. 6. That is, the comparator 86 having a hysteresis compares the temperature T of the magnetron 6 detected by the temperature detecting device 7 with the preset temperature value $T_S$. During the period from the moment where the temperature T of the magnetron 6 reaches the upper limit of the preset temperature $T_S$ to the moment where it decreases to the lower limit of the preset temperature $T_S$, the output power instruction value P is set to zero and during the other period the output power instruction value P is the preset output power value $P_S$.

Figure 10:
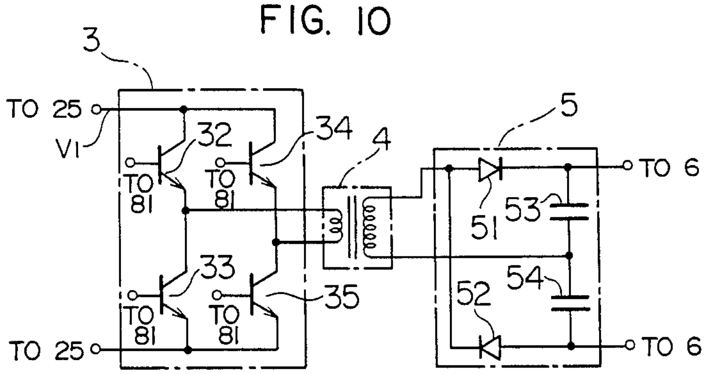
FIG. 10 is a circuit diagram illustrating partially still another embodiment according to this invention.
Figure 11:
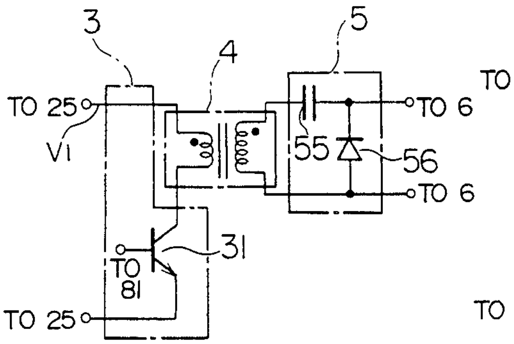
FIG. 11 is a circuit diagram illustrating partially still another embodiment according to this invention.
Figure 12:
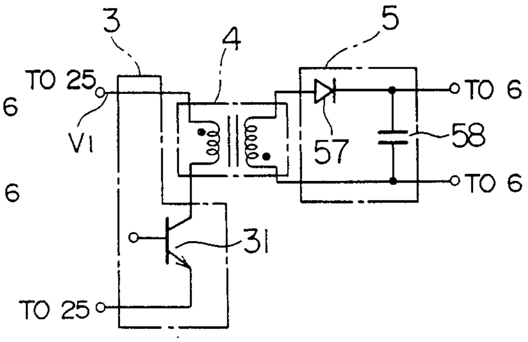
FIG. 12 is a circuit diagram illustrating partially still another embodiment according to this invention.

FIG. 10 is a circuit diagram illustrating partially still another embodiment according to this invention. In FIG. 10 reference numerals 32–35 indicate transistors. In the circuit shown in FIG. 10 the electric power converting circuit 3 is constructed by an inverter instead of the chopper circuit. The transistors 32–35 in the electric power converting circuit (inverter circuit) 3 are controlled by the control circuit 8. After the DC output of the first rectifier circuit 2 has been transformed into high frequency electric power, a DC high voltage is obtained from the second rectifier circuit 5 located at the secondary side of the transformer 4 and supplied to the magnetron 6. In this embodiment also, it is possible to control the temperature T of the magnetron 6 by varying the duty ratio D of the transistors 32–35 depending on the output power instruction value P and the DC voltage $V_I$ just as in the embodiments indicated in FIGS. 3 and 6. FIG. 11 is a circuit diagram illustrating partially still another embodiment according to this invention. In FIG. 11, reference numeral 55 denotes a capacitor and 56 denotes a diode. In the circuit shown in FIG. 11, the second rectifier circuit 5 in FIGS. 3, 6, etc. is constituted by a half-wave voltage doubler circuit. After the DC output of the first rectifier circuit 2 has been transformed into a high voltage electric power by the transistor 31 provided in the electric power converting circuit (chopper circuit) 3, a DC high voltage is obtained from the second rectifier circuit 5 located at the secondary side of the transformer 4 and supplied to the magnetron 6. In this embodiment also, it is possible to control the temperature T of the magnetron 6 by varying the duty of the transistor 31, depending on the output power instruction value P for the output power and the DC voltage $V_I$ just as in the embodiments shown in FIGS. 3 and 6. FIG. 12 is a circuit diagram illustrating partially still another embodiment according to this invention. In FIG. 12, reference numeral 57 denotes a diode and 58 denotes a capacitor. In the circuit shown in FIG. 12, the second rectifier circuit 5 is constructed by an on/off chopper circuit. After the DC output of the first rectifier circuit 2 has been transformed into high frequency electric power by the transistor 31 provided in the electric power converting circuit 3, a DC high voltage is obtained by means of the second rectifier circuit 5 located at the secondary side of the transformer 4 and supplied to the magnetron 6. In this embodiment also, it is possible to control the temperature T of the magnetron 6 by varying the duty of the transistor 31, depending on the output power instruction value P and the DC voltage $V_I$ just as in the embodiments indicated in FIGS. 3 and 6.

In the above embodiments, although the explanation has been made, supposing that the switching element in the electric power converting circuit 3 is a transistor, it is obvious that it can be a self arc extinguishing element such as GTO, MOSFET, SIT, etc.

According to the above embodiments, since it is possible to drive the magnetron below the preset temperature, a power supply for driving a magnetron used for a microwave oven, etc. can be obtained in which overheating of the magnetron is prevented and thus it is not necessary to stop the drive because of the overheating.

Now some embodiments of the switching power supply according to this invention will be explained, referring to FIGS. 13 to 23.

Figure 13:
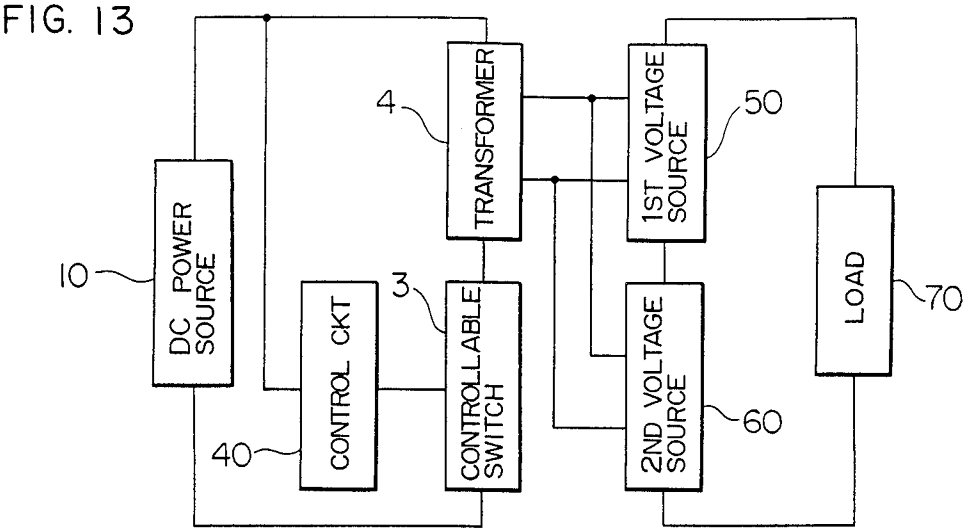
FIG. 13 is a block diagram illustrating still another embodiment of the switching power supply according to this invention.

FIG. 13 is a block diagram illustrating an embodiment of the switching power supply according to this invention, which is equivalent to an assembly of the blocks 3, 4 and 5 in FIG. 3 or 6. The items which are equivalent to those in FIGS. 3 and 6, are indicated by the same reference numbers.

In FIG. 13, reference numeral 10 represents a DC input power source; 4 a transformer; 3 a controllable switch; and 40 a control circuit for controlling the duty ratio for the controllable switch 30. A series circuit consisting of the primary winding of the transformer 4 and the controllable switch 3 is connected with the DC input power source 10. Reference numeral 50 is a first voltage source; 60 a second voltage source; and 70 a load. The first voltage source 50 and the second voltage source 60 are connected with the secondary winding of the transformer 4 and the load 70 is connected with a series circuit consisting of the first voltage source 50 and the second voltage source 60.

Figure 14:
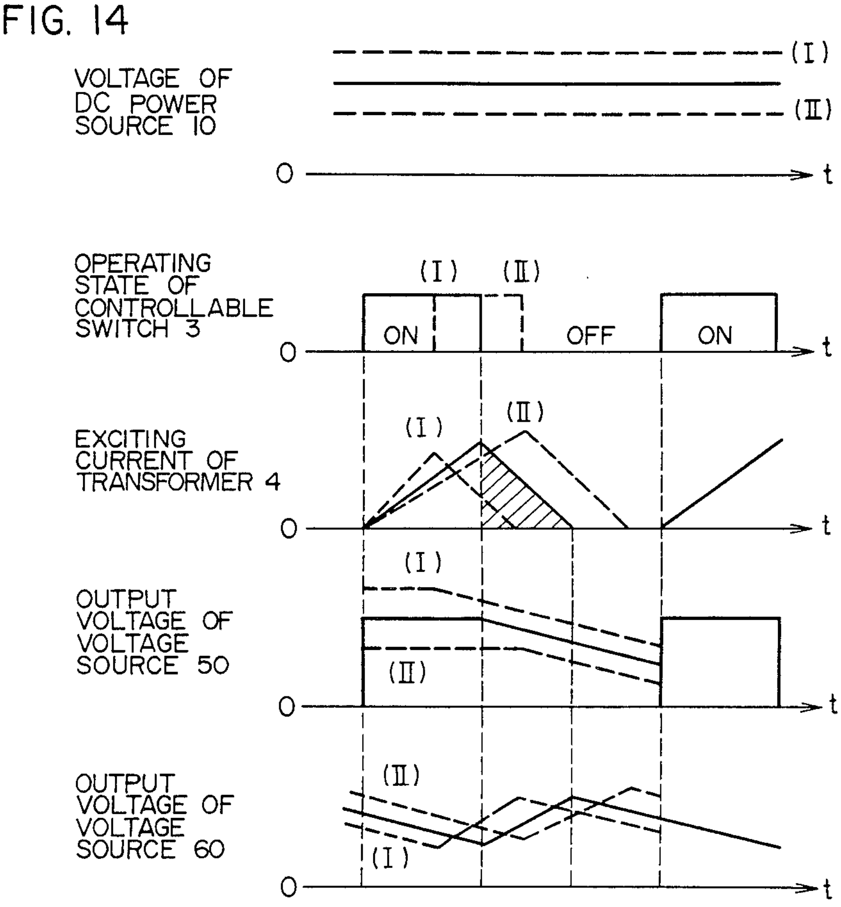
FIG. 14 indicates waveforms useful for explaining the operation of the principal parts in the switching power supply indicated in FIG. 13.

FIG. 14 indicates a set of waveforms for explaining the operation of the principal parts in the switching power supply shown in FIG. 13. The operation of the circuit indicated in FIG. 13 will be explained below, referring to FIG. 14. As indicated by a solid line in FIG. 14, the first voltage source 50 connected with the secondary winding of the transformer 4 outputs a voltage developed in the secondary winding of the transformer, which is proportional to the voltage of the DC power source 10 amd the turn ratio of the transformer 4, during the on-period of the controllable switch 3 as the output voltage. On the other hand, the second voltage source 60 connected with the secondary winding of the transformer 4 outputs as an output voltage thereof a voltage generated by storing therein an energy during the off-period of the controllable switch 3, said energy being fed from a current source which is the exciting energy stored by flowing an exciting current during the on-period of the controllable switch 3 in the exciting inductance of the transformer 4 across which the DC power source 10 is applied. The hatched portion in the waveform of the exciting current for the transformer 4 shown in FIG. 14 represents the amount of the electric charge stored in the second voltage source 60. During the off-period of the controllable switch 3 the voltage of the first voltage source 50 decreases gradually, as indicated in the figure. An electric power corresponding to the sum of the output voltage of the first voltage source 50 and that of the second voltage source 60 is supplied to the load 70 to which the series circuit consisting of the first voltage source 50 and the second voltage source 60 is connected.

The output power supplied to the load 70 is made variable by varying the on/off duty of the controllable switch 30 by means of the control circuit 40 and thus varying the product of the voltage of the DC power source 10 applied to the transformer and the duration of the application.

When the voltage of the power source varies, as indicated by broken lines in FIG. 14, in the case where the voltage of the DC power source 10 increases (broken line I), the control circuit 40 lowers the on/off duty of the controllable switch 3 and reduces the exciting energy owing to the exciting current in the transformer 4. In this way it supplies electric power having a stable voltage to the load 70 by lowering the output voltage of the second voltage source 60, whose current source is the exciting energy, and compensating the increase in the output voltage which is proportional to the source voltage of the first voltage source 50. On the other hand, in the case where the voltage of the DC power source 10 decreases (broken line II), the control circuit 40 enlarges the on/off duty of the controllable switch 3 and increases the exciting energy due to the exciting current of the transformer 4. In this way it supplies electric power having a stable output voltage to the load 70 by increasing the output voltage of the second voltage source 60 and compensating the decrease in the output voltage of the first voltage source 50.

Figure 15:
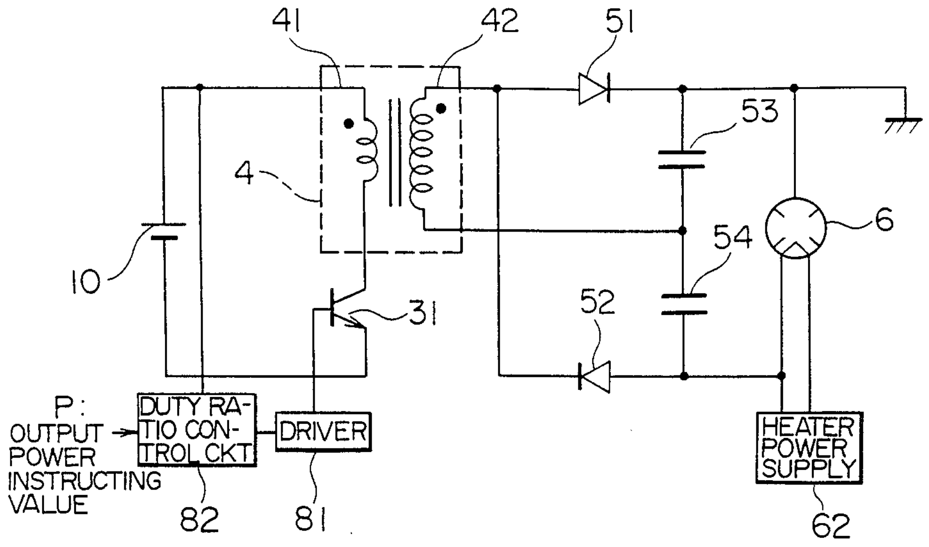
FIG. 15 is a block diagram illustrating still another embodiment of the switching power supply according to this invention.

FIG. 15 is a block diagram illustrating a circuit of the power supply for driving a magnetron, which is another embodiment of the switching power supply according to this invention. In FIG. 15, reference numeral 41 indicates the primary winding of the transformer 4 and 42 indicates the secondary winding of the same, the polarity of the primary winding 41 and the secondary winding 42 being indicated by dots. 31 denotes a transistor constituting the controllable switch 3 and 82 denotes a circuit for driving the transistor 31. The collector of the transistor 31 is connected through the primary winding 41 of the transformer 4 with the positive side of the DC power source 10 and the emitter of the transistor 31 is connected with the negative side of the DC power source 10. 51 and 53 are a first diode and a first capacitor, respectively, constituting the first voltage source 50; 52 and 54 are a second diode and a second capacitor; respectively, constituting the second voltage source 60; 6 is a magnetron which is the load 6; and 62 is a heater power supply for the magnetron 6. The anode of the diode 51 and the cathode of the diode 52 are connected with one end of the secondary winding 52 of the tranformer 4 and one end of the capacitor 53 and one end of the capacitor 54 are connected with the other end of the secondary winding 42 of the transformer 4. The cathode of the diode 51 and the anode (grounded) of the magnetron 6 are connected with the other end of the capacitor 53 and the anode of the diode 52 of the capacitor 54 and the cathode of the magnetron 6 are connected with the other end of the capacitor 54.

Figure 16A:
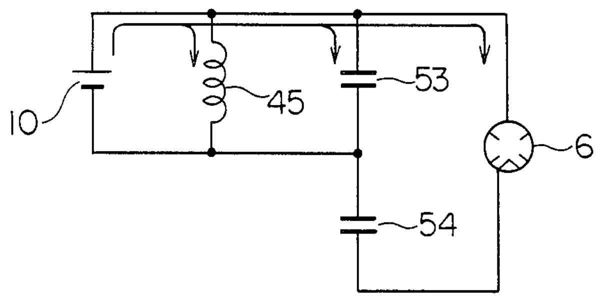
FIGS. 16A and 16B are equivalent circuits illustrating the on- and the off-state of the transistor indicated in FIG. 15, respectively.
Figure 16B:
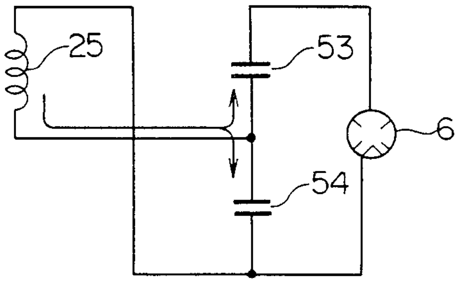

FIGS. 16A and 16B are equivalent circuits illustrating the on-state and the off-state of the transistor 31 indicated in FIG. 15, respectively. In FIGS. 16A and 16B, reference numeral 45 represents the exciting inductance of the transformer 4. The operation of the circuit shown in FIG. 15 when the transistor 31 is switched on and off will be explained below, referring to FIGS 16A and 16B. When the transistor 31 in FIG 16A is on, the first diode 51 constituting the first voltage source 50 becomes conductive and charges the first capacitor 53 with a current in the direction indicated by an arrow from the DC power source 10 and supplies electric power to the magnetron 6, which is the load 70, by applying the sum of the charging voltage for the capacitor 53 and the voltage across the second capacitor 54 constituting the second voltage source. Further, during the switching-on period, the exciting current in the direction indicated by the arrow from the DC power source 10 is supplied to the exciting inductance 45 of the transformer and exciting energy is stored in the exciting inductance 45. On the other hand, during the switching-off period of the transistor 31 in FIG. 16B, an inverse electromotive force is produced in the secondary winding 42 of the transformer 4. Thus, the second diode 52 constituting the second voltage source 60 becomes conductive and charges the second capacitor 54 with a current in the direction indicated by the arrow, said current being originated from a current source which is the exciting energy stored in the exciting inductance during the on-period of the circuit in FIG. 16A. Thus, an electric power is supplied to the magnetron 6 by applying thereto a sum of the charging voltage for the first capacitor 53 and that for the second capacitor 54. In this case, the control circuit 82 drives the transistor 31 through the driving circuit 81 with an on/off duty determined by the voltage of the DC power source 10 and the output electric power to be supplied to the magnetron 6. Further, when the voltage of the DC power source 10 varies, both the secondary voltage and the exciting current of the transformer 20 are controlled by controlling the on/off duty of the transistor 31 just as in the embodiments indicated in FIGS. 13 and 14 so that the charging voltages of both the capacitors 53 and 54 are varied, to thereby suppress the variations in the voltage applied to the magnetron 6 and supply a predetermined output power to the same.

Figure 17:
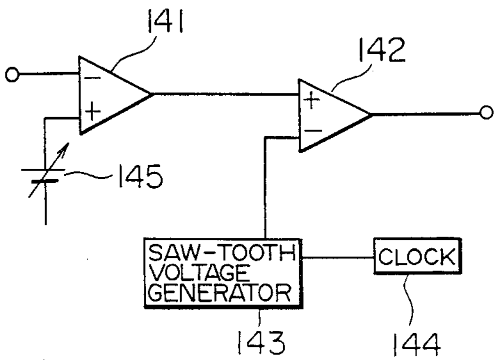
FIGS. 17 and 18 are a block diagram illustrating an example of the duty ratio controlling circuit indicated in FIG. 15 and waveforms useful for explaining the operation, respectively.
Figure 18:
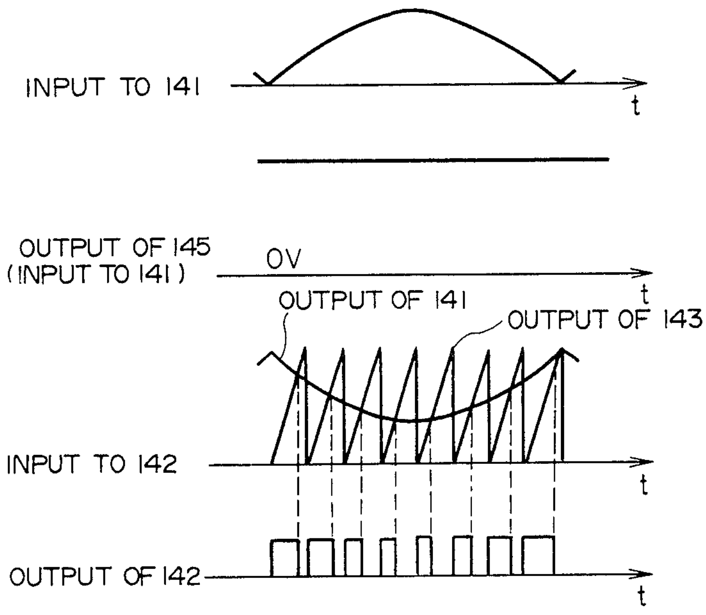

FIG. 17 is a block diagram illustrating the construction of the control circuit 81 and FIG. 18 is a drawing for explaining the operation of the control circuit 81. In FIG. 17, reference numeral 141 represents an operational amplifier; 142 a comparator; 143 a saw-tooth signal generator; 144 a clock; and 145 a reference power supply for setting the output power. The operational amplifier 141 outputs the difference between the voltage setting the output power, of the reference power supply and an input voltage thereto which is representative of the voltage of the DC power source 10 and the comparator 142 compares the output of 141 with the output of the saw-tooth signal generating circuit 143. The comparator 142 outputs a pulse only during the period in which the output of the operational amplifier 141 is greater than the output of the sawtooth wave generating circuit 143. Thus, a pulse width corresponding to the DC input voltage and the preset output power value is obtained. As the power source for 141–144, a voltage obtained e.g. by stepping down the output of the DC input power source by utilizing a suitable means can be used, as indicated in FIGS. 13 and 15 or a voltage obtained by stepping down the input AC power source by utilizing a small transformer and rectifying and smoothing the output thereof can be also used. In the case where the above-mentioned control circuit is used in a circuit indicated either one of FIGS. 3, 6, 8 and 9, the circuit may be constructed such that the reference power supply 145 is controlled by a signal representing the output power instruction value P in such a manner that the voltage of the reference power supply 145 is the output power instruction value P.

Figure 19:
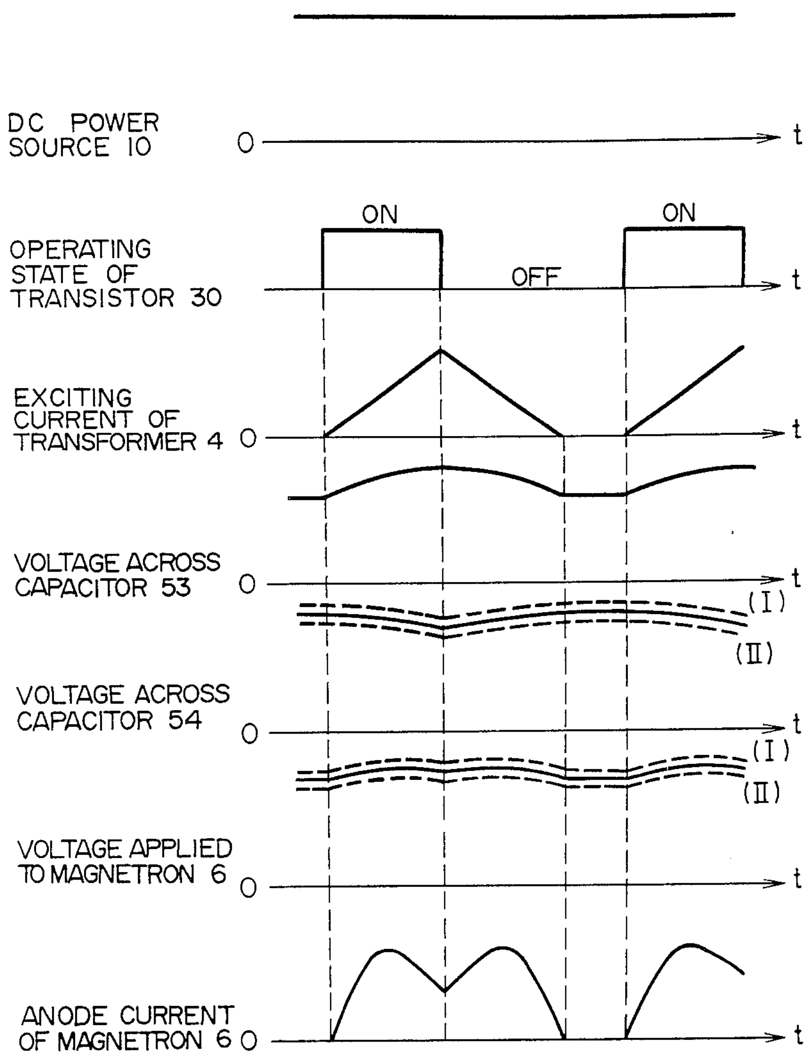
FIG. 19 is a diagram useful for explaining the operation of the circuit indicated in FIG. 15.

FIG. 19 shows an example of a set of waveforms for explaining the operation of various parts of the circuit shown in FIG. 15. The operation of the circuit indicated in FIG. 15, including the operationn when the cut-off voltage of the magnetron 6 varies, will be explained referring to FIG. 19. During the on and off periods of the transistor 31, the circuit operates as shown by the waveforms indicated by the solid lines in FIG. 19. When the cut-off voltage of the magnetron 6 varies, that is, for example, in the case where the cut-off voltage increases, since the anode current, i.e. the quantity of the discharge from the capacitor 54 decreases, the charging voltage of the capacitor 54 during the off-period of the transistor 31, which is the period subsequent to the increase of the cut-off voltage, increases, as indicated by the broken line I in FIG. 19. On the other hand, in the case where the cut-off voltage decreases, since the anode current, i.e. the quantity of the discharge from the capacitor 54 increases, the charging voltage of the capacitor 54 during the off-period of the transistor 31, which is the period subsequent to the decrease of the cut-off voltage, decreases, as indicated by the broken line II in FIG. 19. In this way the charging voltage of the capacitor 54 varies depending on the variations in the cut-off voltage, and the voltage applied to the magnetron 6, which is the sum of the voltage of the capacitor 53 and the charging voltage of the capacitor 54, varies. Thus, it is possible to suppress automatically the variations in the anode current without introducing any control. In this case, the relation among the output voltage P, the voltage E of the DC power source, the cut-off voltage $E_C$ of the magnetron and the on/off duty $\rho$ of the transistor can be represented by the following equation;

$$\rho = \sqrt{\frac{2nfLP}{E} \cdot \left(\frac{1}{nE} - \frac{1}{E_c}\right)}$$

where f denotes the switching frequency of the transistor, n the turn ratio of the transformer and L the exciting inductance of the transformer.

Figure 20A:
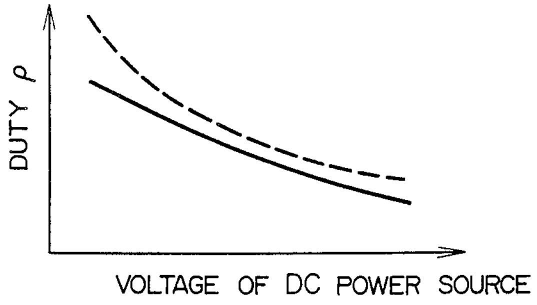
FIGS. 20A and 20B indicate an example of duty VS voltage of the input power source with a constant output power and an example of non-controlled output power characteristic against variation in the cut-off voltage of the magnetron indicated in FIG. 15, respectively.
Figure 20B:
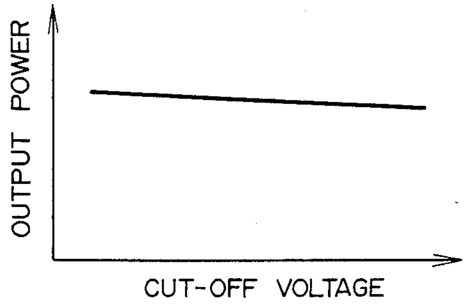

FIGS. 20A and 20B indicate an example of a characteristic of the power supply indicated in FIG. 15, which is obtained by using the above equation. The solid line in FIG. 20A shows the constant output power characteristic controlled by the on/off duty of the transistor 31 with respect to variations in the voltage of the DC power source 10, FIG. 20B shows the noncontrolled output power characteristic against variations in the cut-off voltage of the magnetron. The broken line in FIG. 20A shows characteristics of the prior art on/off chopper scheme. While, in the case of prior art on/off chopper scheme, the on/off duty for a fixed output power shows a non-linear characteristic against variation in the input DC power source, the on/off duty $\rho$ of the transistor 31 for a fixed output power P shows substantially linear characteristic for variation in the voltage E of the DC power source 10 shown in FIG. 15. In addition, the characteristics of the output power P, in the case where the cut-off voltage $E_C$ of the magnetron 6 in FIG. 15 varies, are approximately flat, as indicated in FIG. 20B, and influences of the variations in the cut-off voltage are small.

In this way, in the embodiment indicated in FIG. 15, the first voltage source 50 is formed of the first capacitor 53 and a series circuit which is connected in parallel to the capacitor 53 and consists of the secondary winding 42 and the first diode 51 connected with such a polarity that the secondary winding 42 and the first diode 51 constitute a current path to the first capacitor 53, which current path is conductive during the on-period of the transistor 31, while the second voltage source 60 is formed of the second capacitor 54 and a series circuit which is connected in parallel to the second capacitor 54 and consists of the secondary winding 42 and the second diode 52 connected with such a polarity that the secondary winding 42 and the second diode 52 constitutes a current path to the second capacitor 54 which current path is conductive during the off-period of the transistor 31 and the first capacitor 53 and the second capacitor 54 are connected in series with one another to form a series circuit to which the magnetron 61 is connected. By this simple circuit construction, it is possible to supply electric power having a stable voltage to the magnetron even when the voltage of the input power source and the cut-off voltage of the magnetron vary, and to obtain a predetermined microwave output.

Figure 21:
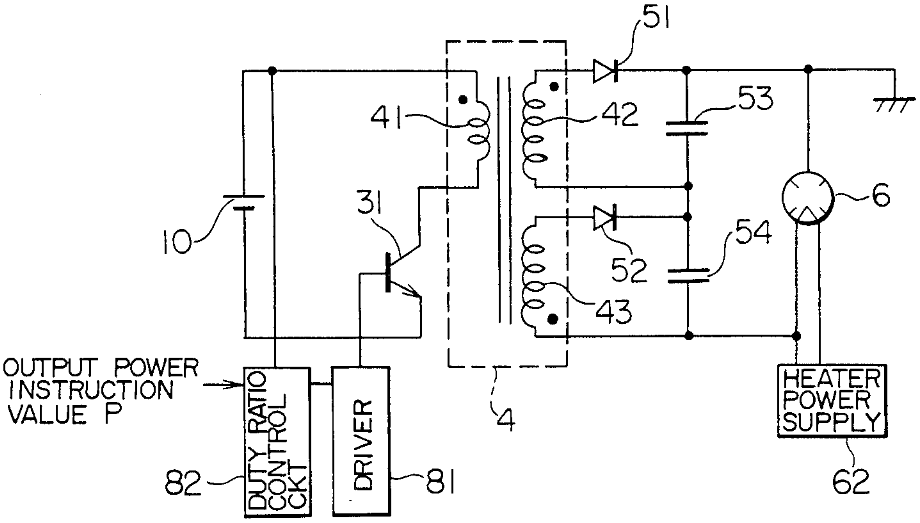
FIG. 21 is a block diagram illustrating still another embodiment of the switching power supply according to this invention.

FIG. 21 is a block diagram illustrating a circuit of the power supply for a magnetron, which is still another embodiment of this invention. In FIG. 21, reference numeral 43 represents the tertiary winding of the transformer 4, whose polarity is indicated by a dot. The embodiment indicated in FIG. 21 is so constructed that the winding for taking out the exciting energy of the transformer, which energy constitutes the current source to the second voltage source 60 consisting of the second diode 52 and the second capacitor 54, is disposed as the tertiary winding 43 separately from the secondary winding 42. The operation and the characteristics of this embodiment are identical to those of the circuit indicated in FIG. 15.

Figure 22:
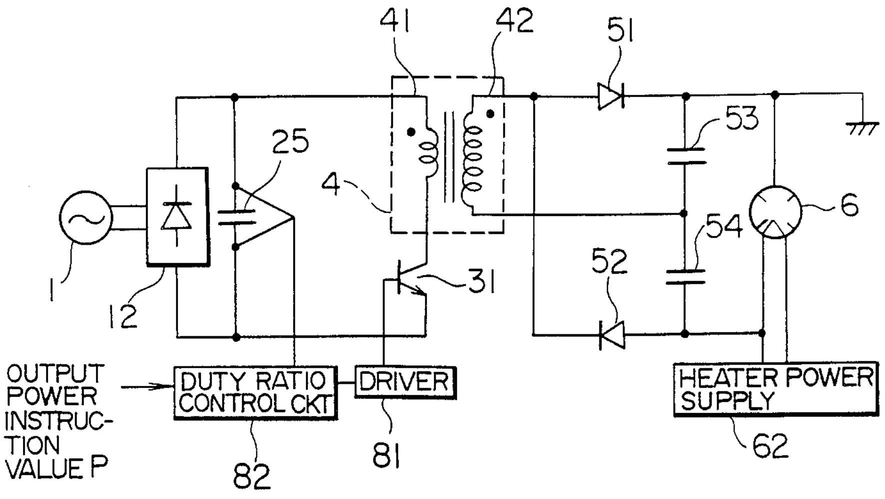
FIG. 22 is a block diagram illustrating still another embodiment of this invention.

FIG. 22 is a block diagram illustrating a circuit of the power supply for a magnetron, which is still another embodiment of this invention. In FIG. 22 reference numeral 1 represents a commercial AC power source, 12 a rectifier circuit (rectifier bridge), 25 a power supply capacitor, which constitutes the DC power source 10. In the embodiment indicated in FIG. 22, the voltage of the DC power source 10 in FIG. 15 is a rectified voltage obtained by full-wave- or half-wave-rectifying the AC voltage of the commercial AC power source 1 by means of the rectifier circuit 12. The predetermined microwave output is obtained by controlling the on/off duty of the transistor 31 through the drive circuit 81 by the duty ratio control circuit 82, depending on the instantaneous value of the rectified voltage developed across the power supply capacitor 25. The operation and the characteristics of this circuit are identical to those of the embodiment indicated in FIG. 15.

Figure 23:
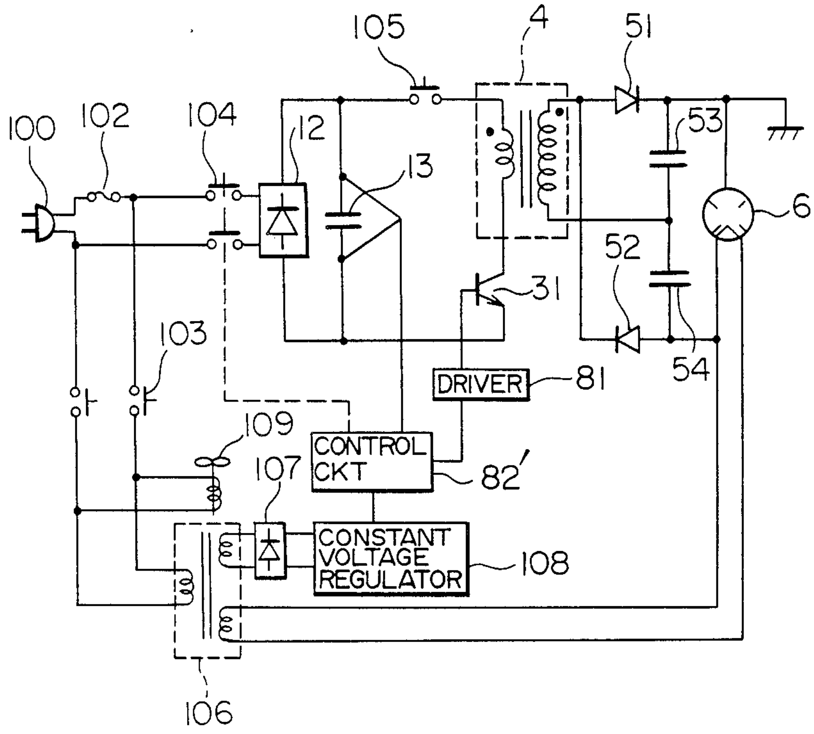
FIG. 23 is a block diagram illustrating still another embodiment of the present invention.

FIG. 23 is a block diagram illustrating a power supply circuit for a microwave oven, which is still another embodiment of the switching power supply according to this invention. In FIG. 23, reference numeral 100 represents an AC plug, 102 a fuse, 103 a power supply switch, 104 a power switch which disconnects the supply of the power source to the transformer 4 and the transistor 31 when some emergency occurs, 105 a door switch, 106 a transformer for the control power supply, 107 a rectifier circuit, 108 a constant voltage circuit, 109 a cooling fan, and 82′ a control circuit for the driving circuit 81 and the power switch 104. The operation and the characteristics of the circuit indicated in FIG. 23 are identical to those of the power supply indicated in FIG. 15.

According to the embodiments of the switching power supply described above and applicable to a power supply for a magnetron in a microwave oven it is possible not only to make the transformer smaller and lighter by driving it at a high frequency, but also to obtain a stable microwave output by supplying electric power having a stable voltage with a simple circuit construction even when there are variations in the input power source voltage and the cut-off voltage of the magnetron, because the power supply according to the present invention has approximately linear duty control characteristics with respect to variations in the voltage of the input power source and is fairly free from the influences on the output power thereof, of variations in the characteristics of a non-linear load such a magnetron.

Although, it is a matter of course that the power supply circuits indicated in FIGS. 13, 15, 21, etc. can be used as a power supply for a magnetron as they are, it is possible also to add means useful for reducing further the switching loss of the controllable switch. This will be explained below.

A converter of the type in which energy is stored in the exciting inductance of the transformer and at the same time supplied to the load during the on-period of the controllable switch and the exciting energy thus stored is supplied to the load during the off-period of the controllable switch, has a tendency that, when the energy stored in the exciting inductance is large, the current flowing through the controllable switch is large, because it is the sum of the exciting current and the load current. For this reason, turn-off loss of the controllable switch increases and at the same time voltage applied to the controllable switch at the turn-off moment is excessively large.

The current flowing though the controllable switch during the on-period of the controllable switch is the sum of the exciting current of the transformer and the current in the secondary circuit. The current in the secondary circuit is determined by the leakage inductance of the transformer, the capacitor on the secondary side and the load. Thus, it is possible to make the current in the secondary circuit oscillatory by choosing suitably the leakage inductance and the capacitance of the capacitor.

Thus, by making the current in the secondary circuit during the on-period of the controllable switch oscillatory, it becomes possible to make the current small which flows through the controllable switch at the moment of the turn-off and is large in the case of the prior art techniques, to thereby make the turn-off loss of the controllable switch smaller and the voltage applied to the controllable switch lower.

More specifically, it is sufficient to choose the circuit parameters so that the current in the secondsry circuit becomes oscillatory and at the same time that the on-period of the controllable switch is longer than the half period of the oscillation period stated above.

Some embodiments of the switching power supply according to this invention, which realizes that described above, will be explained below, referring to FIGS. 24 to 31.

Figure 24:
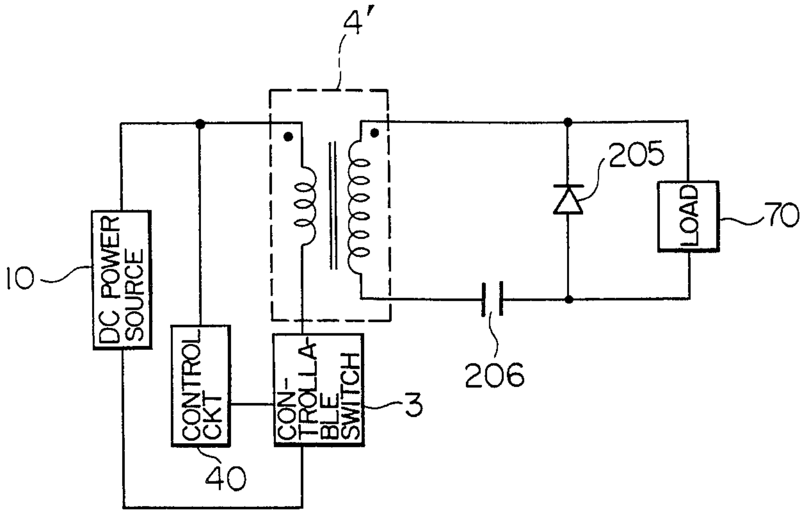
FIG. 24 is a block diagram illustrating still another embodiment of the switching power supply according to this invention.

FIG. 24 is a block diagram illustrating the circuit construction of an embodiment of the switching power supply according to this invention. The embodiment indicated in FIG. 24 will be explained, referring to FIGS. 25 to 29.

Figure 25:
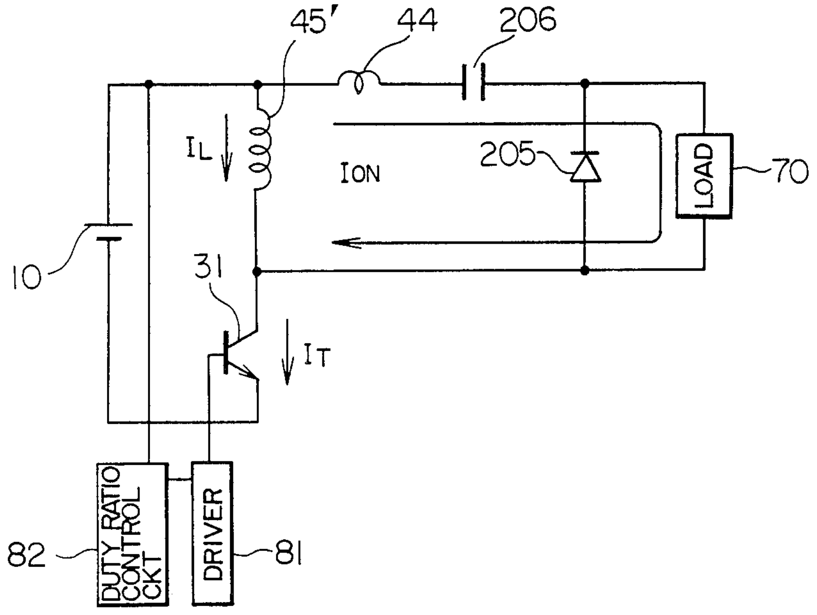
FIG. 25 is an equivalent circuit diagram of the circuit indicated in FIG. 24.

In FIG. 24, reference numeral 10 denotes the DC power source, 4' a transformer; 3 the controllable switch; 40 a control circuit; 205 a diode; 206 a capacitor and 70 a load. The operation of this embodiment will be explained with reference to the equivalent circuit in FIG. 25 and waveforms indicated in FIGS. 26, 27 and 28. In FIG. 25, the output of the DC power source 10 is applied to the exciting inductance 45' during the on-period of the transistor 31, an exciting current $I_L$ flows therethrough, a load current $I_{ON}$ flows through the capacitor, the leakage inductance 44 and the load 70 constituting a series resonance circuit on the secondary side, and a transistor current $I_T$, which is the sum of the exciting current $I_L$ and the resonance current $I_{ON}$, flows through the transistors 31, which current can be represented by the following equation:

$$I_T = I_L + I_{ON}$$

Figure 26:
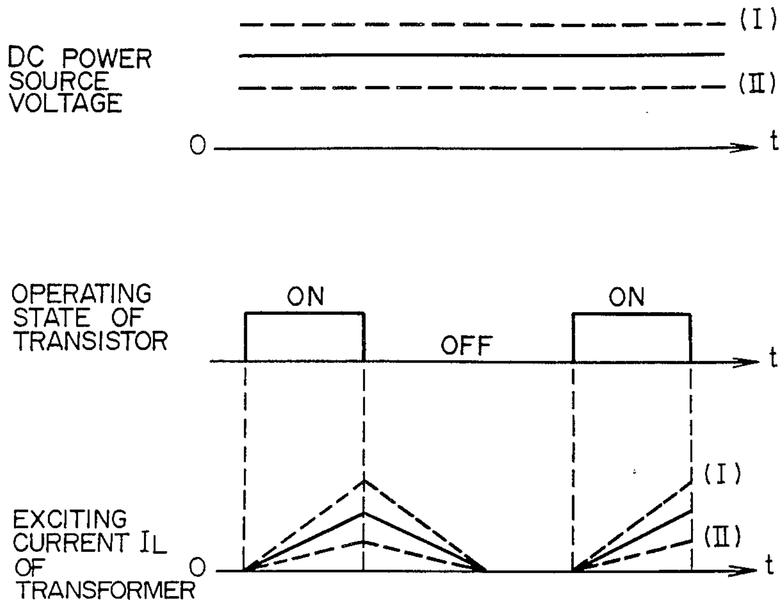
FIGS. 26 and 27 are diagrams useful for explaining the operation of the circuit indicated in FIG. 24.
Figure 27:
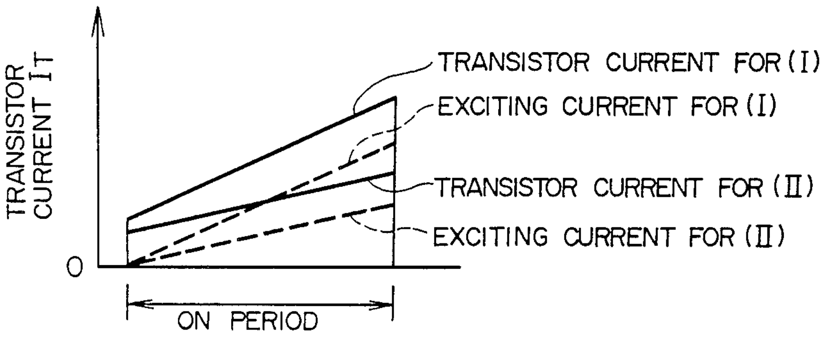

FIGS. 26 and 27 show waveforms of the exciting current $I_L$ and the transistor current $I_T$ when the voltage of the power supply varies. However, they are waveforms in the case where the current $I_{ON}$ flowing through the load 70 is not oscillatory. Supposing that the duration of the on-period is constant, when the voltage of the DC power source increases (broken line I), the exciting current increases (broken line I), too, and when it decreases (broken line II), the exciting current decreases (broken line II), too.

Figure 28:
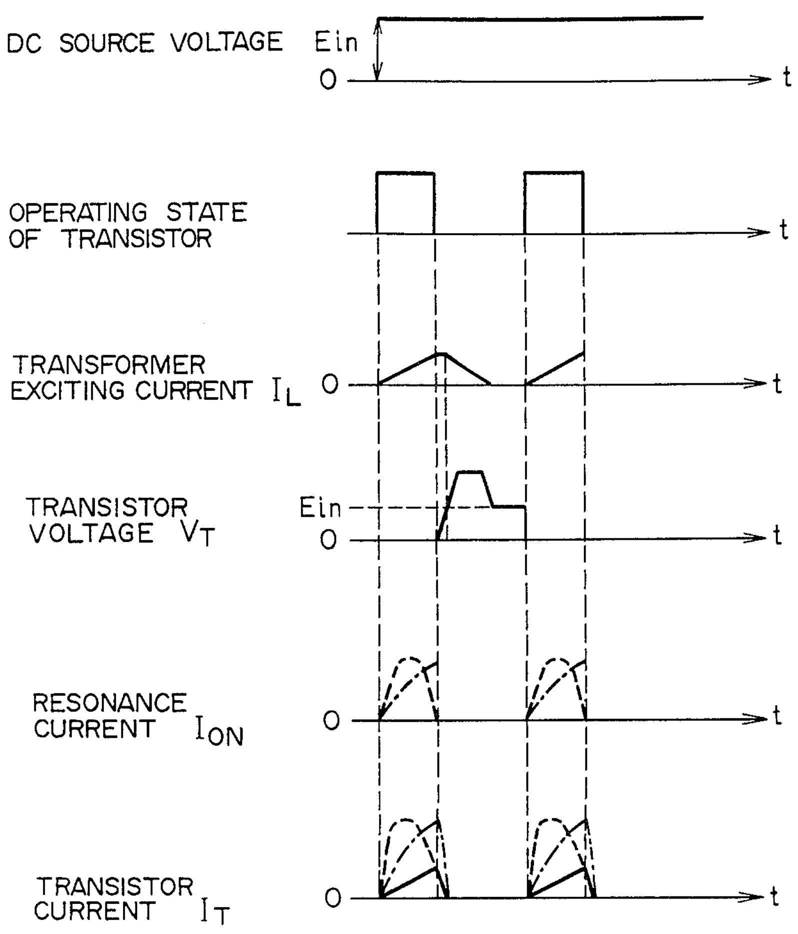
FIGS. 28 and 29 indicate waveforms for explaining the operation of the circuit indicated in FIG. 25.

The transistor current $I_T$ is so constructed that the resonance current $I_{ON}$ is superposed on the exciting current $I_L$ and at the moment of the turn-off, when the exciting current is large, the transistor current is large, too. It will be explained, referring to the waveforms indicated in FIG. 28, that the conventional transistor current at the moment of the turn-off can be reduced by shaping the waveform of the load current $I_{ON}$ to be superposed on the exciting current. FIG. 28 shows waveforms in the case where the load current is made oscillatory and largest at the moment of the turn-off, as indicated in dot-dashed line, or in the case where it is smallest at the end of the on-period, as indicated in broken line. It is possible to make the transistor current at the moment of the turn-off smaller than the conventional value by varying the load current so that it has a waveform such that the current is smallest at the end of the on-period.

Figure 29:
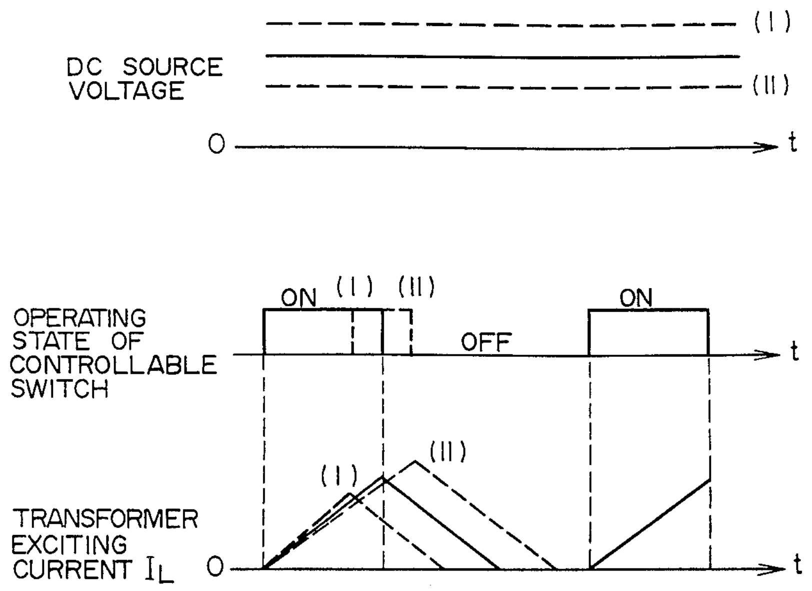

As indicated in FIG. 29, in the case where the transistor 31 is on/off-duty-controlled, e.g. when the voltage of the DC power source 10 increases (broken line I), the duty of the transistor 31 is reduced and the exciting current is made smaller (broken line I). The matters described above are valid, also when the transistor is duty-controlled in this way.

Figure 30:
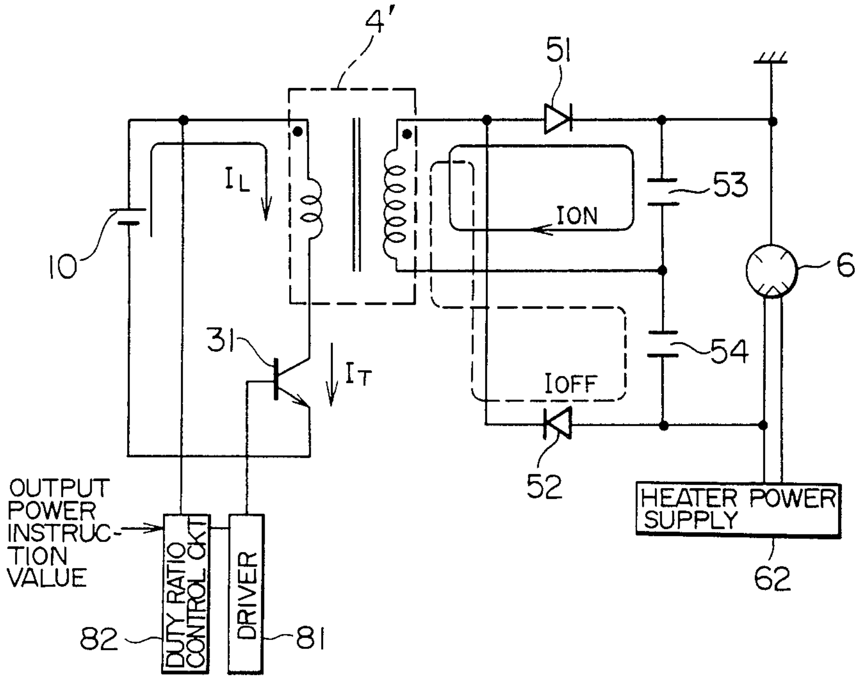
FIG. 30 is a circuit diagram of still another embodiment of the switching power supply according to this invention.
Figure 31:
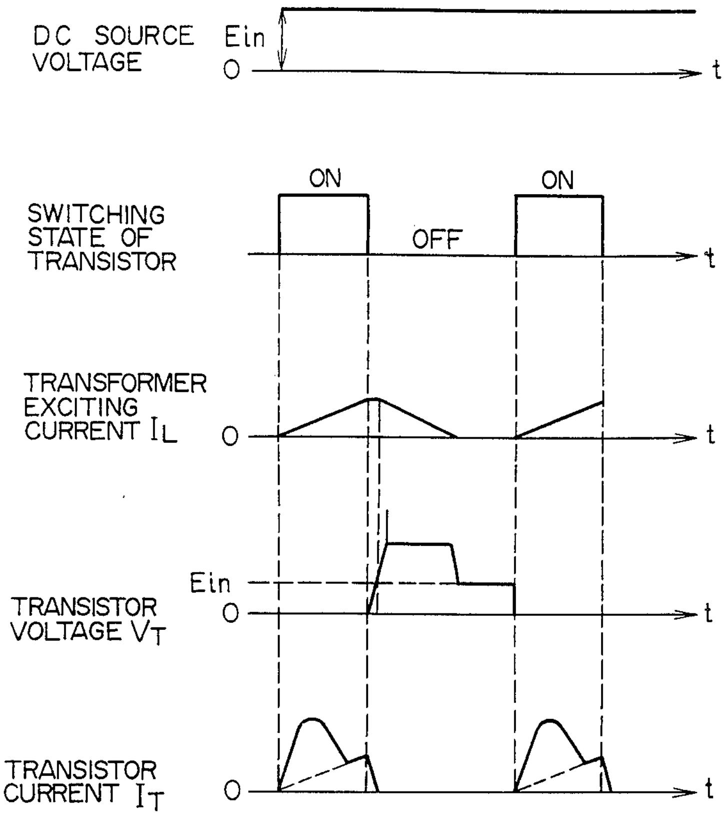
FIG. 31 indicates waveforms for explaining the operation of the circuit indicated in FIG. 30.

Another embodiment of this invention will be explained by using the circuit diagram in FIG. 30 and the waveforms in FIG. 31. The circuit indicated in FIG. 30 is a circuit supplying a stable output to a load constituted by the magnetron, in which the current flowing through the secondary circuit of the transformer, when the controllable switch is switched on, is made oscillatory, as indicated in FIG. 31, by means of the leakage inductance of the transformer 4 and the capacitor 53, and thus the waveform of the transistor current at the moment of the turn-off (the portion indicated with the solid line in the transistor current $I_T$) is made smaller than the value according to the prior art techniques.

According to this embodiment, in a high frequency switching power supply for obtaining a high voltage output by means of a forward converter such as a power supply for a magnetron, etc., since the switching loss at the moment of the turn-off of the controllable switch and the voltage applied thereto can be reduced, it is possible to use a controllable switch having a capacity smaller than what has been necessary heretofore.

In FIGS. 24 to 31, a method for reducing the switching loss of the switching transistor by making the current at the moment of the turn-off of the switching transistor smallest has been indicated, but, hereinbelow, a method to reduce the loss at the moment of the turn-on of the switching transistor will be explained. It is a matter of course that the method indicated in FIGS. 24 to 31 can be also used in combination with this method.

Hereinbelow an embodiment of this invention will be explained, referring to FIGS. 32, 33A and 33B by taking a flyback converter as an example.

Figure 32:
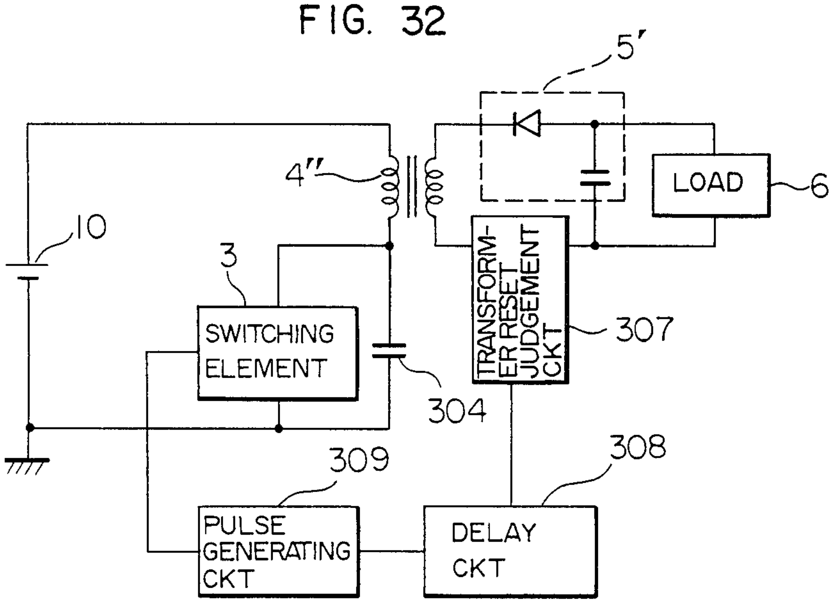
FIG. 32 is a block diagram illustrating still another embodiment of the switching power supply according to this invention.
Figure 33A:
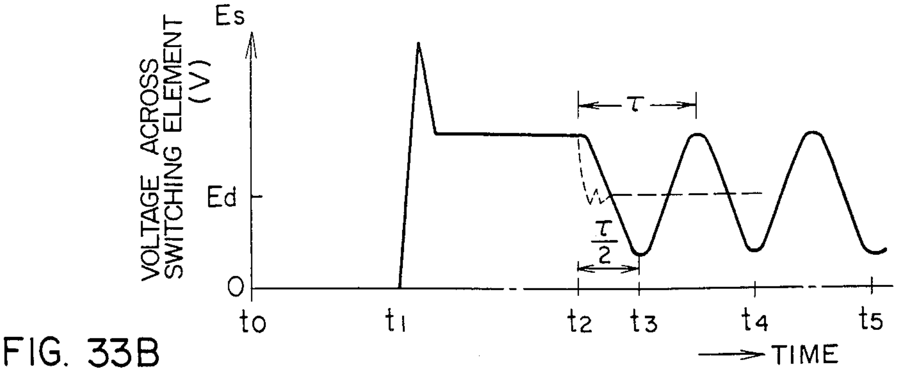
FIGS. 33A and 33B indicate waveforms in the circuit indicated in FIG. 32, wherein FIG. 33A indicates the voltage waveform of the switching element and FIG. 33B indicates the exciting current waveform of the transformer.

In the switching power supply indicated in FIG. 32, the primary winding of the transformer 4" and the switching element 3 are connected in series with the input power source 10 and a capacitor 304 is connected in parallel with the switching element 3. Further this may be another construction, in which a resistor and a diode are added to this capacitor 304, forming a so-called snubber circuit construction. A rectifier circuit 5', a load 6, and a transformer rest judgment circuit 307 are connected with the output side of the transformer 4". Although a flyback type rectifier circuit 5' is shown here, the connection of the rectifier element is naturally not restricted thereto, but it may be another type. Further, the position, where the transformer reset judgment circuit is connected, is not restricted to that indicated in the figure, but it may be any position, where the exciting current of the transformer can be detected. The reset judgment circuit 307 is connected with the switching element 3 through a delay circuit 308 and a pulse generating circuit 309.

The switching power supply thus constructed acts as follows. At first, when the switching element 3 is switched-on, the voltage $E_S$ across the switching element is nearly 0 V, as shown from $t_0$ to $t_1$ in FIG. 33A and the voltage, which is the input voltage $E_d$, is applied to the exciting inductance of the transformer 4″. The current flowing through this exciting inductance is given by $$I = E_d \cdot (t_1 - t_0)/L \quad (1)$$

where L represents the value of the exciting inductance. This current increases linearly with time, as indicated in FIG. 33B. Then, when the switching element 3 is switched-off at a point of time $t_1$, the switching element holds an almost constant voltage until the transformer 4″ is reset after having generated surge voltages. During this period, an exciting current represented by the following equation (2) flows towards the output side of the transformer 4″.

$$I = E_{out} \cdot (t_2 - t_1)/a \cdot L \quad (2)$$

where $E_{out}$ is the voltage applied to the load 6, and a is the turn ratio output side/input side of the transformer.

Figure 33B:
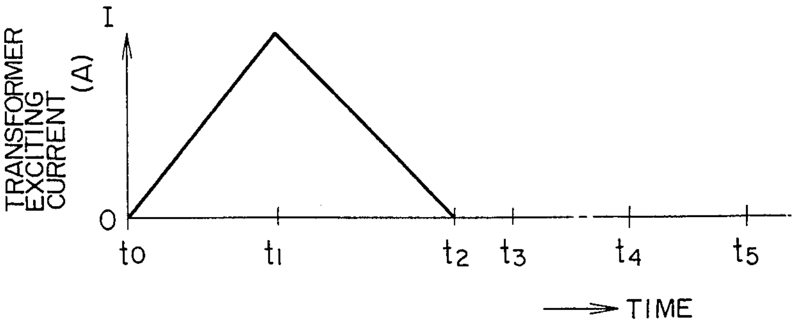

The exciting current reduces to 0 at a point of time $t_2$, as indicated in FIG. 33B. This point is called reset point of the transformer. When the transformer 4″ is reset, since the transformer looses the energy, the voltage of the switching element, which has been kept to be higher than the input voltage $E_d$, begins to fall towards the input voltage $E_d$. Here, if the proposed switching power supply is of small electric power, the voltage $E_s$ of the switching element follows the trace indicated by the dotted line in FIG. 33A. This is generally well known. However, for a power supply of large electric power such as that for a microwave oven, etc., an oscillating voltage is necessarily generated as indicated after $t_2$ in FIG. 33A, due to the exciting inductance of the transformer 4″ and the value of the capacitor 304. The period $\tau$ of this oscillation can be given by $$\tau = 2\pi\sqrt{L \cdot C} \quad (3)$$

where C represents the capacitance of the capacitor 304. Here, in the case where the control according to this invention is not effected, since the switching element can be switched on at any portion of this oscillation waveform, it can occur that it is switched on at the proximity of a peak of the waveform, which produces a large turn-on loss. This invention resolves this problem. Hereinbelow a specific control method will be described. When the exciting current of the transformer in FIG. 32 reaches zero, the reset judgment circuit 307 produces a signal. The delay circuit 308 delays this signal by a half of the value obtained by using the Eq. (3) and sends an instruction indicating the turn-on to the pulse generating circuit 309, and a signal is sent by the pulse generating circuit 309 to the switching element 3 which is turned-on at $t_3$ indicated in FIGS. 33A and 33B. In this way the switching element can be turned-on at a valley portion of the voltage applied to the switching element and thus it is possible to reduce the turn-on loss of the switching element.

Figure 34:
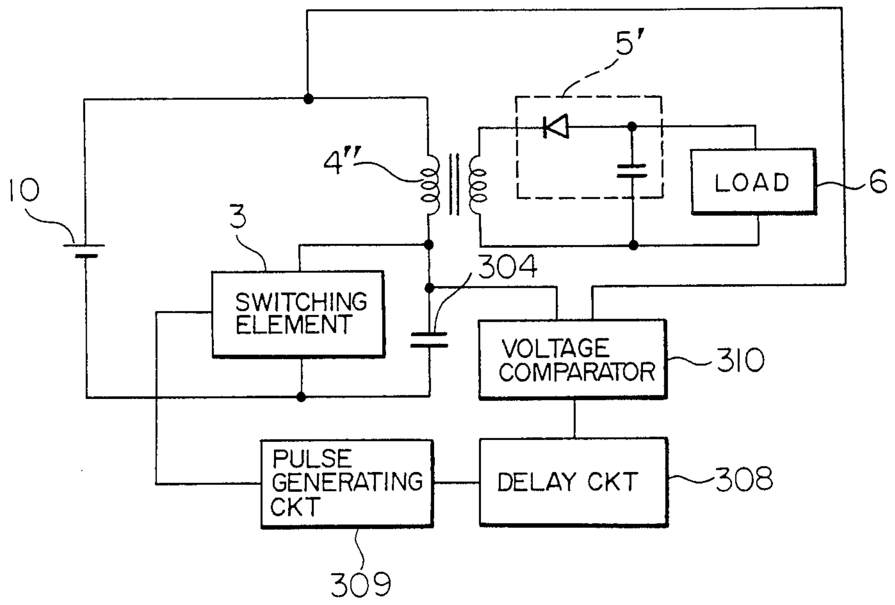
FIG. 34 is a block diagram illustrating still another embodiment of the switching power supply according to this invention.

The control method is not restricted to that described above, but it may be that indicated in FIG. 34. The time sequence in the case of FIG. 34 is shown in FIGS. 35A, 35B and 35C. The switching power supply indicated in FIG. 34 differs from that indicated in FIG. 32 only in that the portion 307 for detecting the on-timing is replaced by a voltage comparator 310 and that the voltage $E_d$ of the input power source is compared with the voltage $E_s$ applied to the switching element in the voltage comparator 310. The voltage comparator 310 outputs a signal "1" when the latter ($E_s$) is higher than the former ($E_d$), and otherwise outputs a signal "0". This waveform is shown in FIG. 35B. The delay circuit 308 delays this signal by $\pi/4$ as indicated in FIG. 35C and sends it to the pulse generating circuit 309. The pulse generating circuit 309 judges the moment of turn-on on the basis of the negative going edge of this signal and sends an on-signal to the switching element 3. In the above description, the polarity of the signals indicated in FIGS. 35B and 35C may be inverse to that indicated in the figures. In this case, the pulse generating circuit 309 judges the moment of turn-on on the basis of the positive going edge.

Further, as the third control method, it is possible to realize the method described below. Both Eq. (1) and Eq. (2) represent the peak value of the exciting current and thus they are equal to one another. Consequently, the following holds true, $$\frac{E_d \cdot (t_1 - t_o)}{L} = \frac{E_{out} \cdot (t_2 - t_1)}{a \cdot L} \quad (4)$$

Figure 37A:
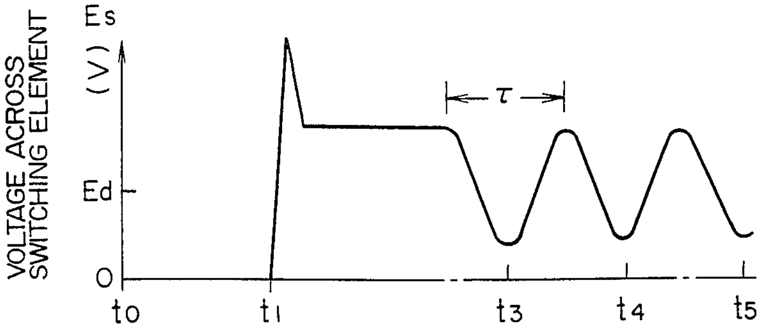
FIGS. 37A and 37B indicate waveforms in the circuit indicated in FIG. 36, wherein FIG. 37A indicates the voltage waveform of the switching element.
Figure 37B:
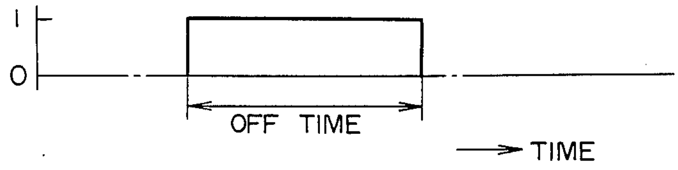

This can be simplified to:

$$(t_2 - t_1) = \frac{a \cdot E_d}{E_{out}} \cdot (t_1 - t_o) \quad (5)$$

where $(t_2 - t_1)$ represents the reset time of the transformer and $(t_1 - t_0)$ the on-time of the switching element. In the case where the switching power supply according to this invention is operated under the conditions that the output voltage $E_{out}$ in Eq. (5) is a fixed value and that $$E_d \cdot (t_1 - t_0) = \text{const.} \quad (6)$$

the reset time $(t_2 - t_1)$ becomes constant. Further, since the resonance period $\tau$ of the oscillating voltage of the switching element can be also obtained previously by using circuit parameters, the off-time $T_{off}$ of the switching element can be given by:

$$T_{off} = \frac{a \cdot E_d}{E_{out}} \cdot T_{on} + \tau/2 \quad (7)$$

where $T_{on}$ may be a constant period of time. This embodiment is indicated in FIG. 36 and its time sequence in FIG. 37B. In the switching power supply indicated in FIG. 36, the switching element is turned-on by giving an off-time setting circuit 311 a certain period of time, as indicated in FIG. 37B, and giving the pulse generating circuit 309 an on-instruction at a point of time $t_3$.

Figure 38:
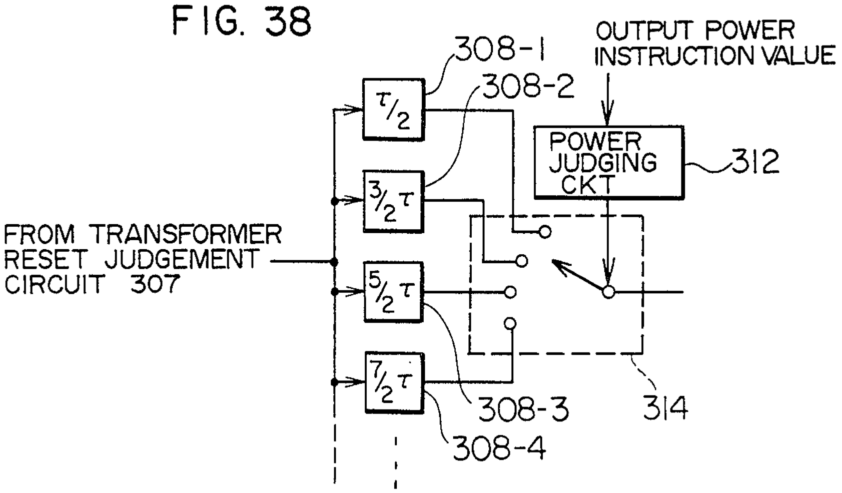
FIG. 38 is a block diagram illustrating a modification of the circuit indicated in FIG. 32.

Although in the above description a control method, by which the switching element is turned-on at the first valley ($t_3$) of the voltage applied thereto, has been described, it is possible to effect the power control in such a manner that the switching element is turned-on at the second valley, the third valley - - - ($t_4$, $t_5$, . . . ), as examples, by which this method is applied. That is, in the switching power supply indicated in FIG. 32, the delay circuit 308 is replaced by a delay circuit 308-1, 308-2, - - - , whose delay time is $\pi/2$, $3\pi/2$, $5\pi/2$, $7\pi/2$, - - - , respectively, as indicated in FIG. 38, and a delay time suitable for obtaining a necessary power is selected in a digital manner. A power judging circuit 312 is controlled by e.g. the output power instruction value P which is the output of a duty ratio adjust circuit (constituted by 83-85, 90, 91) indicated in FIG. 3 and a delay time corresponding to a specified output power is selected by a selection circuit 314.

Figure 39:
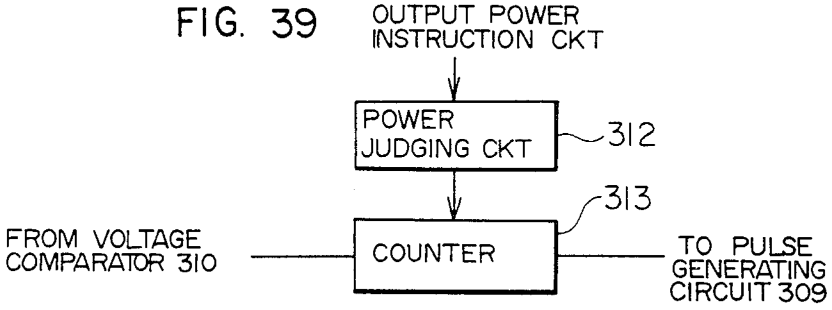
FIG. 39 is a block diagram of a modified part of the circuit indicated in FIG. 34.

In the switching power supply indicated in FIG. 34, the power control is effected such that the power judging circuit 312 specifies a count number of a counter 13 in a digital manner, which counter counts the number of falling edges of the signal indicated in FIG. 35C, as indicated in FIG. 39.

Figure 40:
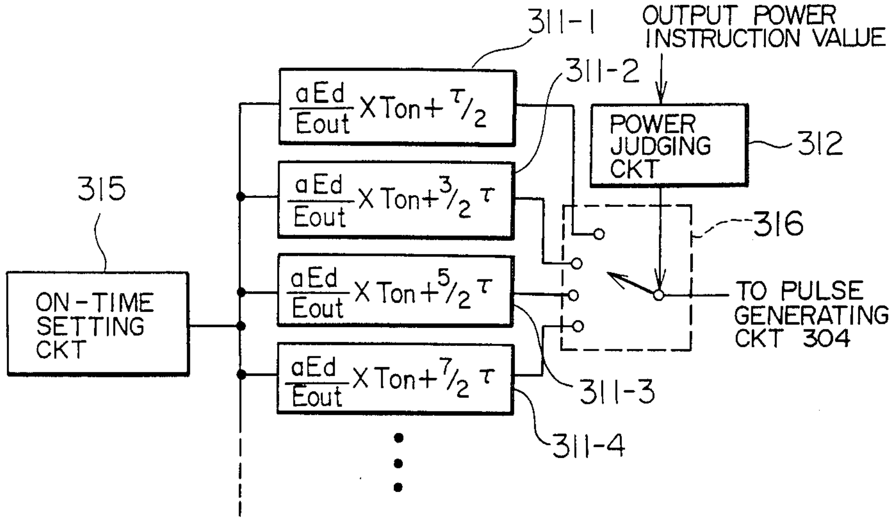
FIG. 40 is a block diagram of a first modification of the circuit indicated in FIG. 36.

In the switching power supply indicated in FIG. 36, an off-time suitable for obtaining a necessary power is selected in a digital manner among various off-times set as indicated in FIG. 40. In FIG. 40, in response to a signal representing the on-time set in the on-time setting circuit 315, the off-time setting circuits 311-1, 311-2, - - - generate various signals representing the various off-times. The power judging circuit 312 drives the selection circuit 316 constituted by electronic or mechnical switches, responding to the instruction value for the output, and thus selects a suitable off-time. This scheme is a frequency control scheme, by which the on-time is constant and the output is controlled by varying the off-time. In addition, in the power supply indicated in 36, the transformer reset judging circuit 307 and the voltage comparator 310, which are necessary in the power supplies indicated in FIGS. 32 and 34, are not necessary. This holds true also in the case where the control is effected according to the scheme indicated in FIG. 40.

Figure 41:
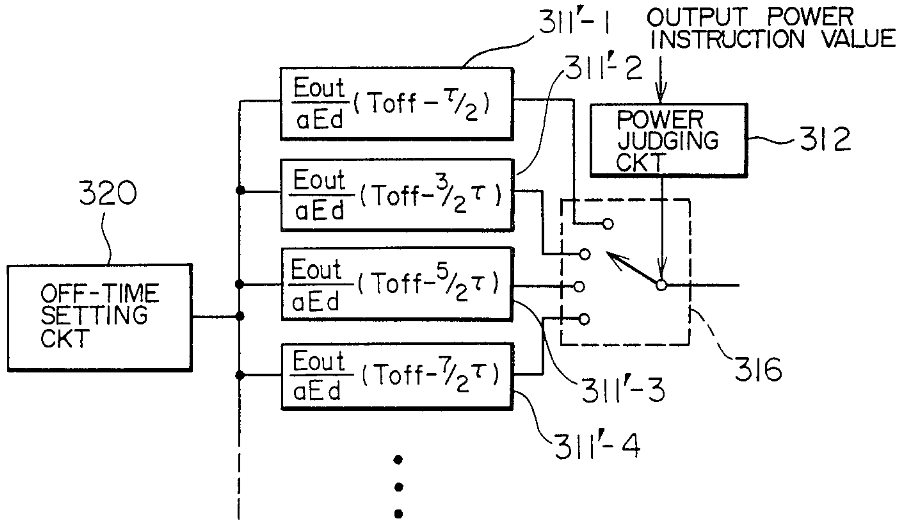
FIG. 41 is a block diagram of a second modification of the circuit indicated in FIG. 36.

The switching power supply indicated in FIG. 36 can control the power also be selecting the on-time in a digital manner. That is, since $$T_{on} = \frac{E_{out}}{a \cdot E_d} \cdot (T_{off} - \tau/2) \quad (8)$$

is obtained when Eq. (7) is resolved with respect to the on-time $T_{on}$, an on-time $T_{on}$ is selected among those set as indicated in FIG. 41, depending on the necessary power. In this case the on-time setting circuit indicated by 311 in FIG. 36 should be reread to off-time setting circuit. In FIG. 41, in response to a signal representing the off-time set by the off-time setting circuit 320, on-time setting circuits 311'-1, 311'-2, - - - generate various signals representing the on-time. The power judging circuit 312 drives the selection circuit 316, responding to the instruction value for the output power and selects a suitable on-time. This scheme is a frequency control scheme, by which the off-time is constant and the power is controlled by varying the on-time. In addition, in the case where the control is effected according to the scheme indicated in FIG. 41, the transformer reset judging circuit 307 and the voltage comparator 310, which are necessary in the power supplies indicated in FIGS. 32 and 34, are not necessary, just as for the case where the control is effected according to the scheme indicated in FIG. 40.

Figure 42:
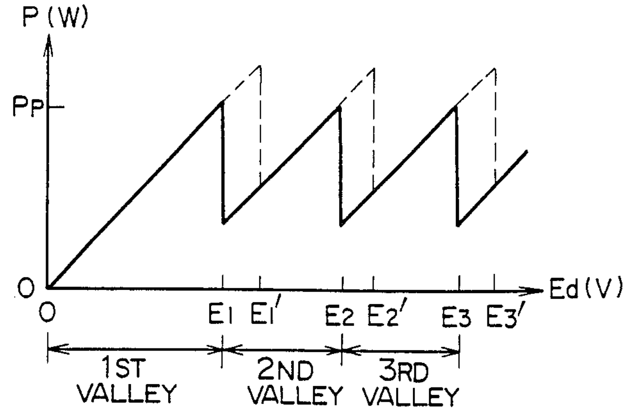
FIG. 42 is a diagram for explaining the power control according to this invention.

The above-mentioned scheme can be further modified. That is, in a modified method, a valley to be used in selected from a plurality of valleys, depending on variations in the input voltage $E_d$. That is, in the power supply indicated in FIG. 42, the switching element is turned-on at the first valley when the input voltage lies between 0 and $E_1$, and is turned-on at the second valley when the input voltage lies between $E_1$ and $E_2$, to thereby control the output power. In this case, setting of the values $E_1$, $E_2$, $E_3$ and the like can be changed to, for example, $E_1$, $E_2$, $E_3$ and the like, as shown in FIG. 42, for obtaining the necessary power.

This scheme is particularly useful when the input DC power source is the one obtained by rectifying but not smoothing the input AC power source. In addition, when compared with a resonance type converter, the switching power supply according to this invention can be used with a reduced frequency by displacing the on-timing to the second, the third, . . . valley, while, in a resonance type converter, the switching frequency should be generally increased, when the input voltage $E_d$ is increased. This is effective for reducing the switching loss of the switching element.

Figure 43:
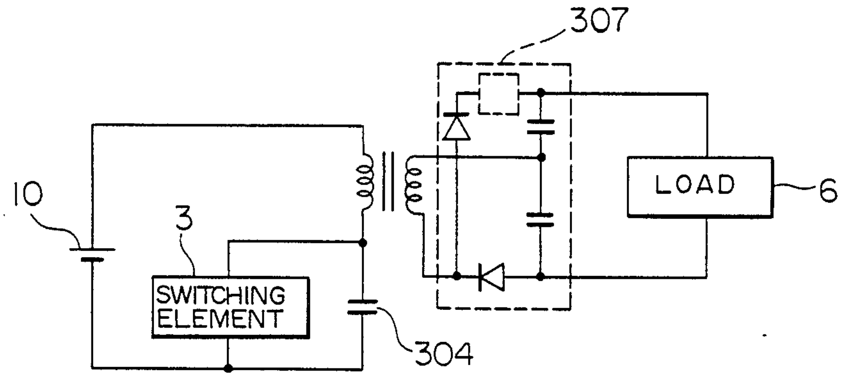
FIGS. 43 to 46 are circuit diagrams of power supplies to which this invention can be applied.

Although this scheme has bee explained taking the flyback converter as an example, as can be understood from Eqs. (1) to (8), this scheme is independent of the output side of the transformer and thus valud not only for the half-wave rectifier type or the full-wave rectifier type but also for the voltage-doubler type of the forward converter, provided that the switching power supply is of only one transistor type. It is a matter of course that the above described scheme can be utilized for the power supplies of FIGS. 13, 15 and 21, and that switching loss can be reduced most remarkably, when this scheme is combined with these power supplies. In the case where the scheme indicated in FIG. 32 is applied to the power supply according to this invention indicated in FIG. 43, e.g. the transformer reset judging circuit is inserted in the position indicated in the figure. However, this position is not restricted to that indicated in the figure, but the transformer reset judging circuit can be inserted in any position, where the reset current can be detected. In the case of the scheme where the voltage comparator 310 is used, it may be located at the same position as in FIG. 34.

Figure 44:
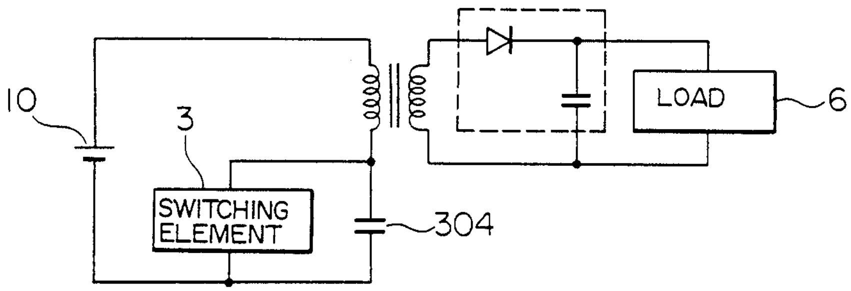
Figure 45:
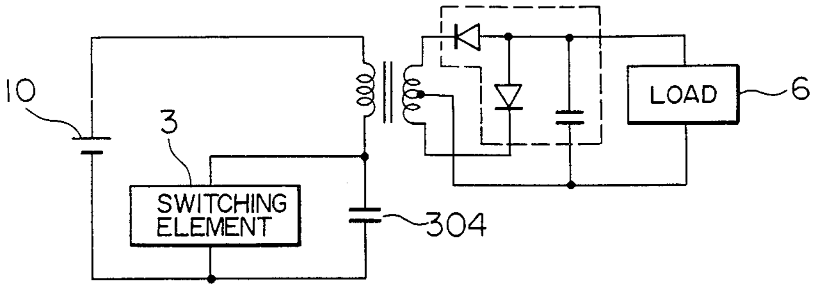
Figure 46:
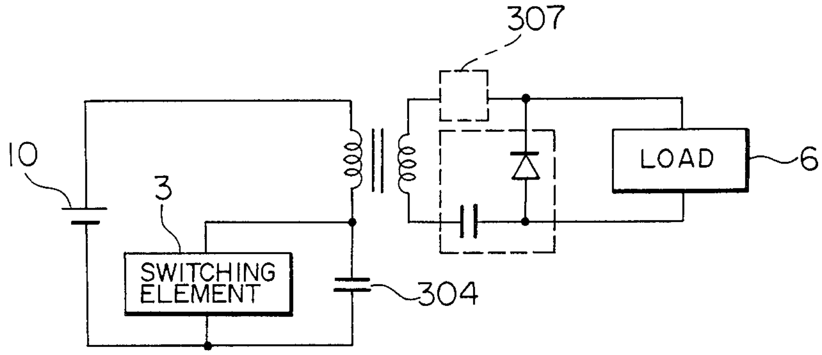

Other examples of the power supply, to which the scheme according to this invention can be applied are shown in FIGS. 44 to 46, FIG. 44 illustrating the half-wave rectification; FIG. 45 the full-wave rectification; FIG. 46 the voltage-double half-wave rectification. In the power supply indicated in FIG. 46, the transformer reset judging circuit 307 may be located at the position indicated in the figure. However, it is not restricted to this position, but it may be any position, where the reset current can be detected.

In the power supplies indicated in FIGS. 44 and 45, since the reset current flows only through the primary side, the reset judging circuit should be connected in series with the transformer on its primary side.

As explained above, the switching power supply according to this invention can make the switching loss extremely small only by adding additional circuits described above thereto and therefore very advantageous in practice.

According to these embodiments, since the turn-on loss of the switching element can be reduced, not only the efficiency of the power supply circuit can be ameliorated, but also following effects can be obtained.

(1) A switching element having a smaller power loss than that used heretofore can be used. Owing to this fact, the cost can be reduced and also it is possible to make the switching element smaller and lighter.

(2) Since the switching frequency can be further increased, it is possible to make the transformer smaller and lighter and thus the cost therefor lower.

We claim:

1. A switching power supply for supplying DC output power to a load operable below a predetermined operating temperature comprising:

first rectifier means to be connected with an AC power source, for rectifying a first AC voltage supplied by said AC power source into a DC input voltage;

electric power converting means to be connected with said first rectifier means, for converting said input DC voltage into a desired DC output power, said electric power converting means including a DC-to-AC converting means for converting controllably said DC input voltage into a second AC voltage, transformer means for stepping up said second AC voltage to a third AC voltage, and second rectifier means for rectifying said third AC voltage and producing said AC output power to be supplied to said load; and first control means for controlling said DC-to-AC converting means so that said second rectifier means outputs a preset value of DC output power, said first control means including means for detecting a temperature of said load and, only when said detected temperature is higher than a predetermined operating temperature, for controlling the switching means to reduce the present value of DC output power, thereby keeping the load temperature below said predetermined operating temperature.

2. A switching power supply according to claim 1, wherein said first control means comprises:

drive means for driving said DC-to-AC converting means, in response to a control signal corresponding to said preset value; and means for comparing said detected temperature with said predetermined operating temperature for said load and adjusting said control signal, depending on the difference between said detected temperature and said predetermined operation temperature when said detected temperature is higher than said predetermined operating temperature.

3. A switching power supply according to claim 1, wherein said transformer means includes a transformer having a primary winding connected with said first rectifier means, said DC-to-AC converting means includes at least a switching element connected in series with said primary winding and said first rectifier means, and said first control means includes drive means for driving said switching element, duty ratio controlling means for controlling said drive means so that said switching element is turned on and off with a duty ratio corresponding to a control signal and control signal generating means for generating said control signal on the basis of said detected temperature and said preset value.

4. A switching power supply according to claim 3, wherein said control signal generating means includes means for comparing said detected temperature with a predetermined operating temperature for said load and adjusting said control signal, depending on the difference between said detected temperature and said predetermined operating temperature when said detected temperature is higher than said predetermined operating temperature.

5. A switching power supply according to claim 4, wherein said adjust means includes means for supplying said control signal corresponding to said preset value to said duty ratio controlling means as it is when said detected temperature is lower than said predetermined operating temperature, said duty ratio being determined by said preset value and said DC input voltage of said first rectifier means, and corrects said control signal corresponding to said preset value, depending on the difference between said detected temperature and said predetermined operating temperature when said detected temperature is higher than said predetermined operating temperature.

6. A switching power supply according to claim 4, wherein said adjust means includes means for supplying said control signal corresponding to said preset value to said duty ratio controlling means as it is when said detected temperature is lower than said predetermined operating temperature, and changes said control signal to a signal level corresponding to said DC output power which is zero when said detected temperature exceeds said predetermined operating temperature.

7. A switching power supply according to claim 1, wherein said transformer means includes a primary winding connected with said first rectifier means and at least a secondary winding coupled magnetically with said primary winding, said DC-to-AC converting means includes switching means connected between said primary winding and said first rectifier means and having a control input for switching said DC input voltage in response to the driving signal given to the control input to produce said second AC voltage to be applied to said transformer means, said switching means being switched on and off in response to said driving signal given to the control input, and said second rectifier means includes a first voltage source connected with said secondary winding of said transformer and outputting the voltage developed across said secondary winding during the on-period of said switching means and a second voltage source connected with said secondary winding of said transformer and storing exciting energy in said transformer by using the exciting inductance of said transformer as a current source during the off-period of said switching means, said first voltage source and said second voltage source being connected in series.

8. A switching power supply according to claim 7, wherein said second rectifier means includes a first diode, which is conductive during the on-period of said switching means, and a second diode, which is conductive during the off-period of said switching means, both being connected with said secondary winding, said first voltage source includes a first capacitor, which is charged through said first diode, and said second voltage source includes a second capacitor, which is charged through said second diode.

9. A switching power supply according to claim 8, wherein said first control means comprises:

drive means producing said driving signal;

duty ratio controlling means for controlling said drive means so that said switching means is driven with a duty ratio corresponding to said detected temperature and said preset value; and control signal generating means for generating a control signal for controlling said duty ratio controlling means on the basis of said detected temperature and said preset value.

10. A switching power supply according to claim 9, wherein said first control signal generating means includes means for comparing said detected temperature with a predetermined operating temperature for said load and adjusting said control signal, depending on the difference between said detected temperature and said predetermined operating temperature when said detected temperature is higher than said predetermined operating temperature.

11. A switching power supply according to claim 10, wherein said adjust means includes means for supplying said control signal corresponding to said preset value to said duty ratio controlling means as it is when said detected temperature is lower than said predetermined opeating temperature, said duty ratio being determined by said preset value and said DC input voltage of said first rectifier means, and for correcting said control signal corresponding to said preset value, depending on the difference between said detected temperature and said predetermined operating temperature when said detected temperature is higher than said predetermined operating temperature.

12. A switching power supply according to claim 10, wherein said adjust means includes means for supplying said control signal corresponding to said preset value to said duty ratio controlling means as it is when said detected temperature is lower than said predetermined operating temperature, and for changing said control signal to a signal level corresponding to said DC output power which is zero when said detected temperature exceeds said predetermined operating temperature.

13. A switching power supply according to claim 8, wherein a leakage inductance of said transformer and the value of said first capacitor are so set that a waveform of the current flowing through said secondary winding during the on-period of said switching means is oscillatory.

14. A switching power supply according to claim 1, wherein said transformer means includes a primary winding connected with said first rectifier means and at least a secondary winding coupled magnetically with said primary winding, said DC-to-AC converting means includes switching means connected between said primary winding and said first rectifier means and having a control input, for switching said DC input voltage, in response to the driving signal given to the control input, and for developing said second AC voltage to be applied to said transformer means, and a capacitor connected in parallel with said switching means, said switching means being switched on and off, in response to said driving signal given to the control input, a resonance voltage being developed by the exciting inductance of said transformer and said capacitor across said switching means during the off-period of said switching means, and said first control means includes:

means for producing signals representing a plurality of valley points of said resonance voltage;

drive means for outputting a pulse signal, which turns on said switching means, as said driving signal; and means for selecting one of the signals representing a plurality of valley points on the basis of said detected temperature and said preset value, whereby said drive means turns on said switching means at a valley point of said resonance voltage corresponding to the signal representing the selected valley point, in response to said selected valley point.

15. A switching power supply according to claim 14, wherein said second rectifier means includes a first voltage source connected with said secondary winding of said transformer, for outputting the voltage developed across said secondary winding during the on-period of said switching means and a second voltage source connected with said secondary winding of said transformer, for storing exciting energy in said transformer by using the exciting inductance of said transformer as a current source during the off-period of said switching means, said first voltage source and said second voltage source being connected in series.

16. A switching power supply according to claim 15, wherein said second rectifier means includes a first diode which is conductive during the on-period of said switching means, and a second diode which is conductive during the off-period of said switching means, both being connected with said secondary winding, said first voltage source includes a first capacitor which is charged through said first diode, and said second voltage source includes a second capacitor which is charged through said second diode.

17. A switching power supply according to claim 16, wherein a leakage inductance of said transformer and the value of said first and the second capacitors are so set that the waveform of the current flowing through said secondary winding during the on-period of said switching means is oscillatory.

18. A switching power supply for supplying a constant DC power to a non-linear load comprising:

a transformer having a primary winding to be connected with a DC power source and at least a secondary winding magnetically coupled with said primary winding;

switching means connected in series with said primary winding for controllably connecting during an on-period and disconnecting during an off-period said primary winding repeatedly with and from said DC power source;

a first voltage source connected with said secondary winding, to which electric power produced in said secondary winding during the on-period when said primary winding is connected with said DC power source, is supplied;

a second voltage source connected with said transformer, to which the energy stored in the exciting inductance of said transformer during said on-period is supplied during the off-period, when said primary winding is disconnected from said DC power source;

said first and said second voltage source being connected in series and forming an output circuit for said switching power supply, an output power of said output circuit being supplied to the load; and control means for controlling said switching means on the basis of a voltage of said DC power source so that said output power of said output circuit is constant irrespective of a fluctuation in the voltage of said DC power source.

19. A switching power supply according to claim 18, wherein said first voltage source is connected with said secondary winding and includes a first capacitor which is charged through a first diode which is conductive during said on-period, and said second voltage source is connected with said secondary winding and includes a second capacitor which is charged through a second diode during said off-period.

20. A switching power supply according to claim 19, wherein said control means comprises duty ratio controlling means for controlling the duty ratio of said on-period to said off-period.

21. A switching power supply according to claim 20, wherein said duty ratio controlling means comprises means for controlling said duty ratio on the basis of an output setting signal representing the desired output power of said switching power supply and the value of the voltage of said DC power source.

22. A switching power supply according to claim 18, wherein said second voltage source is connected with said secondary winding.

23. A switching power supply according to claim 18, wherein said transformer has another secondary winding magnetically coupled with said primary winding and said second voltage source is connected with said another secondary winding.

24. A switching power supply according to claim 18 wherein said load includes a magnetron.

25. A switching power supply comprising:

a transformer having a primary winding to be connected with a DC power source and at least a secondary winding coupled with said primary winding;

switching means connected in series with said primary winding for controllably connecting during an on-period and disconnecting during an off-period said primary winding repeatedly with and from said DC power source;

secondary circuit means connected with said secondary winding, including at least a diode and at least a capacitor, for transforming the AC electric power produced in said secondary winding into an output DC power; and wherein a leakage inductance of said transformer and a value of said capacitor are so set that a waveform of a current flowing through said secondary winding during the on-period of said switching means, when said primary winding is connected with said DC power source, is oscillatory.

26. A switching power according to claim 25, wherein said diode and said capacitor are connected with said secondary winding so that said capacitor is charged during said on-period through said diode, and said secondary circuit means includes another diode and another capacitor, said another diode and said another capacitor being connected with said secondary winding so that said another capacitor is charged through said another diode during the off-period of said switching means, when said primary winding is disconnected from said DC power source, and said switching power supply further comprising means for controlling said switching means on the basis of a voltage of the DC power source so as to keep the output DC power constant.

27. A switching power supply comprising:

a transformer having a primary winding to be connected with a DC power supply and at least a secondary winding magnetically coupled with said primary winding;

switching means connected in series with said primary winding in series controllably connecting during an on-period, and for disconnecting during an off-period said primary winding repeatedly with and from said DC power source;

a capacitor connected in parallel with said switching means;

secondary circuit means connected with said secondary winding, for transforming an AC electric power developed across said secondary winding into an output DC power;

drive means for driving said switching means; and control means including means for detecting an arbitrary one of a plurality of valley points of an oscillating voltage developed across said switching means during the off-period when said primary winding is disconnected from said DC power source, for controlling said driving means, said drive means being responsive to said detection means for driving said switching means at a point of time corresponding to the detected valley point.

28. A switching power supply according to claim 27, wherein said control means select the valley point to be detected depending on the desired DC output power.

29. A switching power supply according to claim 27, wherein said secondary circuit means comprises:

a first voltage source connected with said secondary winding, and electric power developed in said secondary winding during an on-period of said switching means being supplied to said first voltage, said primary winding is connected with said DC power source during said on-period, and a second voltage source connected with said transformer, an energy stored in the exciting inductance of said transformer during said on-period being supplied during said off-period, said first and said second voltage sources being connected in series and the DC output power being supplied to the load from said first and said second voltage sources connected in series, and said control means including means for controlling said switching means on the basis of a voltage of said DC power source so as to keep the output DC power constant irrespective of a fluctuation in the voltage of said DC power source.

* * * * *